US007421046B2

(12) United States Patent
Wallace et al.

(10) Patent No.: US 7,421,046 B2
(45) Date of Patent: Sep. 2, 2008

(54) METHOD AND APPARATUS FOR SIGNAL DECODING IN A DIVERSITY RECEPTION SYSTEM WITH MAXIMUM RATIO COMBINING

(75) Inventors: Bradley A. Wallace, Austin, TX (US); James Ward Girardeau, Jr., Austin, TX (US); James Robert Kelton, Austin, TX (US)

(73) Assignee: ViXS Systems Inc., Toronto, Ontario (CA)

( * ) Notice: Subject to any disclaimer, the term of this patent is extended or adjusted under 35 U.S.C. 154(b) by 856 days.

(21) Appl. No.: 10/376,486

(22) Filed: Feb. 28, 2003

(65) Prior Publication Data

US 2004/0198265 A1 Oct. 7, 2004

Related U.S. Application Data

(60) Provisional application No. 60/437,409, filed on Dec. 31, 2002.

(51) Int. Cl.
*H04B 7/10* (2006.01)
*H04L 27/00* (2006.01)

(52) U.S. Cl. ............... 375/347; 375/316; 375/324; 375/325; 375/341; 375/349

(58) Field of Classification Search ............... 375/267, 375/316, 340–341, 346–347, 299, 232–236, 375/260–261, 285, 229; 455/132–134, 101, 455/148; 714/794–796; 370/206, 210; 708/323
See application file for complete search history.

(56) References Cited

U.S. PATENT DOCUMENTS

| | | | | |
|---|---|---|---|---|
| 5,202,903 A | * | 4/1993 | Okanoue | 375/347 |
| 6,473,393 B1 | * | 10/2002 | Ariyavisitakul et al. | 370/203 |
| 6,549,512 B2 | * | 4/2003 | Wu et al. | 370/210 |
| 6,940,932 B2 | * | 9/2005 | Henriksson | 375/347 |
| 6,973,296 B2 | * | 12/2005 | Webster et al. | 455/296 |
| 7,065,146 B1 | * | 6/2006 | Lou et al. | 375/262 |
| 7,113,548 B2 | * | 9/2006 | Tanaka et al. | 375/267 |
| 7,120,212 B1 | * | 10/2006 | Launay et al. | 375/347 |
| 7,133,473 B1 | * | 11/2006 | Lou et al. | 375/341 |
| 7,236,548 B2 | * | 6/2007 | Ghosh et al. | 375/347 |
| 2003/0002471 A1 | * | 1/2003 | Crawford et al. | 370/343 |
| 2003/0053564 A1 | * | 3/2003 | Kim et al. | 375/326 |
| 2003/0112902 A1 | * | 6/2003 | Ghosh et al. | 375/347 |
| 2003/0123582 A1 | * | 7/2003 | Kim et al. | 375/347 |

\* cited by examiner

*Primary Examiner*—Mohammad Ghayour
*Assistant Examiner*—Sophia Vlahos

(57) ABSTRACT

A method signal for decoding in a diversity reception system can include converting the received RF signal into a plurality of digital baseband signals; phase aligning the plurality of digital baseband signals to produce a plurality of phase aligned digital baseband signals; determining a plurality of error terms from the plurality of phase aligned digital baseband signals; one of which corresponding to one of the plurality of phase aligned digital baseband signals; determining a plurality of weighting factors for the plurality of error terms based on characteristics of the plurality of digital baseband signals, one of which corresponding to one of the plurality of error terms; applying the plurality of weighting factors to the plurality of error terms to produce a plurality of weighted error terms; summing the plurality of weighted error terms to produce an error term for decoding.

30 Claims, 19 Drawing Sheets convolutional encoder diversity reception system 10 diversity receiver system 30

RF channel spectrum channel spectrum single symbol encoding single subcarrier supporting an interleaved encoded symbol transmission process for 64 QAM OFDM signal reception process for 64 QAM OFDM signal error term (e0) from recovered interleaved symbol error term (e1) from recovered interleaved symbol error term (e2) from recovered interleaved symbol error term (e3) from recovered interleaved symbol error term (e4) from recovered interleaved symbol error term (e5) from recovered interleaved symbol branch metric values from e0 and e3 (b0 and b3)

branch metric values from e2 and e5 (b2 and b5)

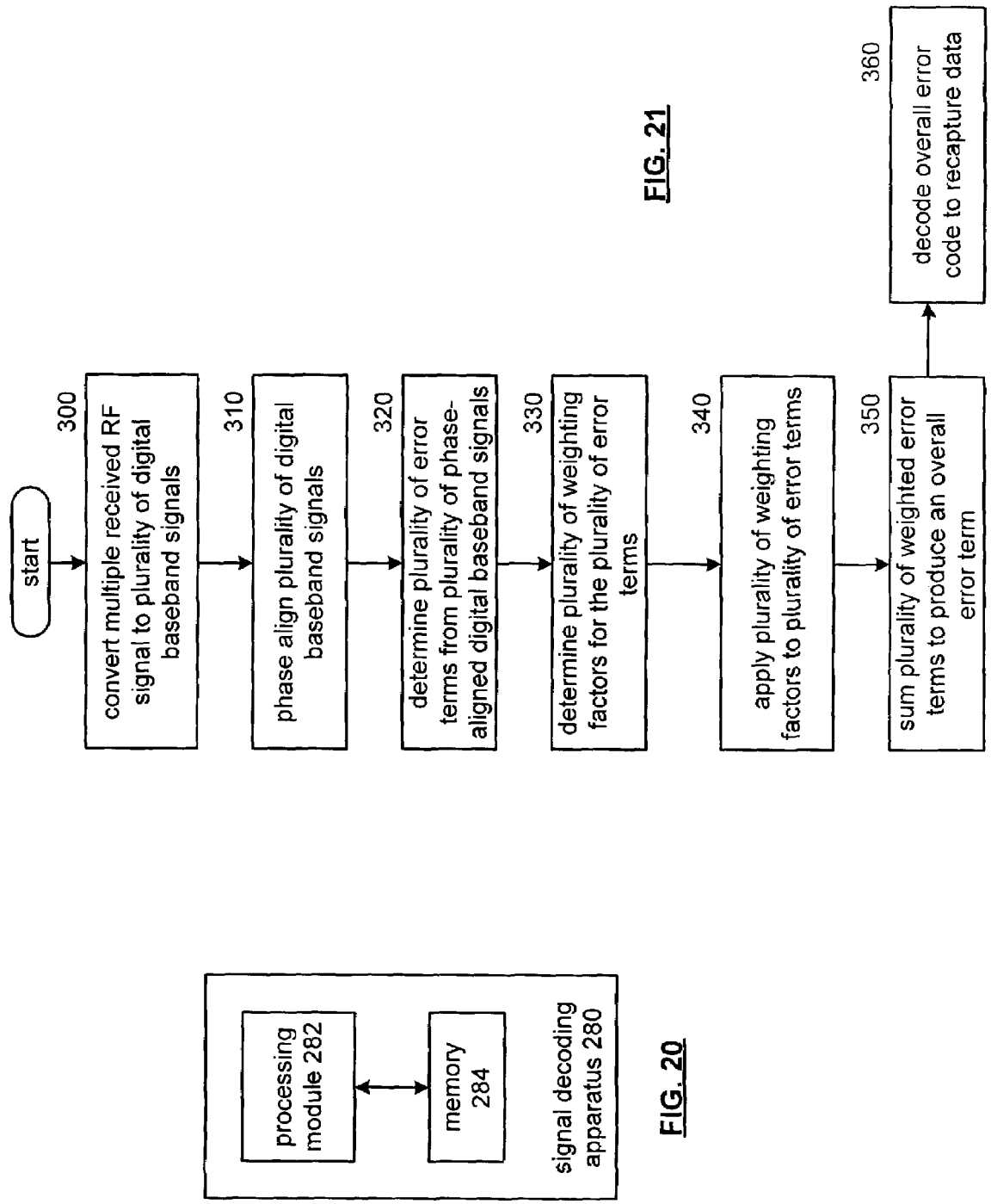

METHOD AND APPARATUS FOR SIGNAL DECODING IN A DIVERSITY RECEPTION SYSTEM WITH MAXIMUM RATIO COMBINING

This patent application is claiming priority under 35 USC §119(e) to provisionally filed patent application having the same title as the present patent application, having a serial number of 60/437,409, and a filing date of Dec. 31, 2002.

TECHNICAL FIELD OF THE INVENTION

This invention relates generally to radio frequency communication systems, and, more particularly, to a method and apparatus for radio frequency signal decoding with maximum ratio combining in a diversity reception system.

BACKGROUND OF THE INVENTION

Wireless communication has become increasingly important as a means of transferring information in all areas of society. Government, business and consumer markets have all benefited from the increasing sophistication and availability of wireless communication methods and devices. For example, the use of pagers, cellular telephones and wireless-capable personal digital assistants ("PDAs") is now commonplace. Wireless communication is also used extensively in personal and business computing. Wireless communication offers networked devices flexibility unavailable to devices in a conventional physically connected network. Untethered from conventional network connections, wireless-capable network users can move almost without restriction. Medical professionals can obtain patient records, real-time vital signs and other reference data at the patient bedside without relying on paper handling or reams of paper charts. Factory floor workers can access part and process specifications without wired network connections, which may be impractical on the factory floor. Warehouse inventories may be carried out and verified using wireless scanners linked to a main database. Multimedia data may be served to various home entertainment devices within a home without a need to install cabling between all of the various home entertainment devices.

Standards for conducting wireless communications between networked devices, such as in a local area network (LAN) are known. The Institute for Electrical and Electronics Engineers ("IEEE") offers a standard, IEEE 802.11, for multiple carrier communications over wireless LAN systems. IEEE 802.11 includes standard proposals for wireless LAN architectures. Supported architectures include an ad-hoc LAN architecture in which every communicating device (node) on the network is allowed to directly communicate with every other node. In the ad-hoc LAN architecture, there are no fixed nodes on the network and devices may be brought together to form the network "on the fly". One method of maintaining an ad-hoc network includes defining one device as being a network master, with other devices representing network slaves. Another supported architecture is an infrastructure in which the network includes fixed network access points. Mobile devices access the network through the network access points, which may be connected to a wired local network.

IEEE 802.11 also imposes several specifications on parameters of both physical (PHY) and medium access control (MAC) layers of the network. The PHY layer handles the transmission of data between network nodes or devices and is limited by IEEE 802.11a to orthogonal frequency division multiplexing (OFDM). IEEE 802.11a utilizes the bandwidth allocated in the 5 GHz Unlicensed National Information Infrastructure ("U-NII") band. Using OFDM, lower-speed subcarriers are combined to create a single high-speed channel. IEEE 802.11a defines a total of 12 non-overlapping 20 MHz channels. Each of the channels is divided into 64 subcarriers, each approximately 312.5 KHz wide. The subcarriers are transmitted in parallel. Receiving devices process individual signals of the subcarriers, each individual signal representing a fraction of the total data.

Other standards also exist within IEEE 802.11. For example, 802.11b limits the PHY layer to either direct sequence spread spectrum ("DSSS"), frequency-hopping spread spectrum, or infrared ("IR") pulse position modulation. Spread spectrum is a method of transmitting data through radio frequency ("RF") communications. Spread spectrum is a means of RF transmission in which the data sequence occupies a bandwidth in excess of the minimum bandwidth necessary to send it. Spectrum spreading is accomplished before transmission through the use of a code that is independent of the data sequence. The same code is used in the receiver (operating in synchronism with a transmitter) to de-spread the received signal so that an original data sequence may be recovered. In direct sequence spread spectrum modulation, the original data sequence is used to modulate a wide-band code. The wide-band code transforms the narrow band, original data sequence into a noise-like wide-band signal. The wide-band signal then undergoes a form of phase-shift keying (PSK) modulation. In frequency-hopping spread spectrum, the spectrum associated with a data-modulated carrier is widened by changing the carrier frequency in a pseudo-random manner.

Wireless communication devices are linked through data channels. A data channel is a frequency band used for transmitting data. Multiple carriers within a data channel may be utilized for transmitting data. Carriers are specific frequencies used to provide a set of data. Each carrier is assigned a constellation. The constellation is a map including various points identifying particular symbols used for transmitting a particular set of bits. The number of bits assigned to a point indicates a number of bits transferred per symbol received. Different carriers may be assigned unique constellations.

IEEE 802.11a and IEEE 802.11b specify a particular MAC layer technology, carrier sense multiple access with collision avoidance (CSMA-CA). CSMA is a protocol used to avoid signals colliding and canceling each other out. When a device or node on the network receives data to be transmitted, the node first "listens" to ensure no other node is transmitting. If the communications channel is clear, the node transmits the data. Otherwise, the node chooses a random "back-off factor" that determines an amount of time the node must wait until it is allowed to access the communications channel. The node decrements a "back-off" counter during periods in which the communications channel is clear. Once the back-off counter reaches zero, the node is allowed to attempt a channel access.

A radio receiver is known to include a low noise amplifier, one or more intermediate frequency stages, filters and a receiver baseband processor. The low noise amplifier amplifies radio frequency (RF) signals received via an antenna and provides the amplified RF signals to the one or more intermediate frequency stages. The one or more intermediate frequency stages mixes the amplified RF signal with one or more local oscillations to produce a receive baseband signal. The receiver baseband processor, in accordance with a particular wireless communication standard, decodes and/or demodulates the baseband signals to recapture data therefrom.

An IEEE 802.11a compliant receiver baseband processor includes analog to digital converters (ADC), fast-fouriertransform module (FFT), frequency equalization module (FEQ), a slicing module, a de-interleaving module and a decoder. The analog to digital converters receive an analog representation of the baseband signal, which for an IEEE 802.11a compliant system includes 64 sub-carriers each of which is an individual sinusoid having a unique amplitude and phase offset to represent encoded data, and converts the analog baseband signals into digital baseband signals. The resulting digital baseband signals include 64 time domain digital signals, each of which is a digital signal representing a particular amplitude and a particular phase of the corresponding analog sub-carriers. The FFT module converts the time domain digital baseband signals into frequency domain baseband signals. For an IEEE802.11a compliant system, the fast-fourier-transform module converts each of the 64 time domain sinusoidal waveforms into 64 bins of I and Q components. The frequency equalization module is programmed to filter the noise injected by the radio frequency channel into the received RF signal.

The slicing module, which may be a soft slicing module or a hard slicing module, generates symbol estimation information for each bin of I and Q components. The de-interleaving module de-interleaves the symbol estimation information, which is subsequently routed to the decoder. The decoder converts the de-interleaved symbol estimation information into branch metrics and recaptures the encoded data from the branch metrics.

In such a receiver baseband processor, the slicing module is a critical component not only from an accuracy standpoint (e.g., errors in the estimation information produces errors in the resulting data), but also from an efficiency standpoint. As is known, a hard slicing module generates error values based on Hamming distance, which indicates the number of bits that are different between the estimated symbol (i.e., the received I and Q values) and the ideal symbols (i.e., the I and Q values for each constellation point of a binary phase shift keying (BPSK) system, quadrature phase shift keying (QPSK) system, 16 QAM (quadrature amplitude modulation) system, or a 64 QAM system). Accordingly, the hard slicing module generates 2 error values for QPSK, 4 error values for 16 QAM, and 6 error values for 64 QAM modulation schemes. The decoder produces the branch metrics from the error terms using an exclusive OR function that is an increasingly iterative process as the number of error values increase.

A soft slicing module generates error terms based on a Euclidean distance, which is a physical measure of the error between the actual symbol value and each ideal symbol value. The soft slicing module generates four error terms for QPSK, 16 error terms for 16 QAM and 64 error terms for 64 QAM. As such, even though a soft slicing module generally provides a 3 dB signal-to-noise ratio improvement over a hard slicing module, it requires a significant amount of processing resources to produce the error values.

While communications standards, such as IEEE 802.11a, allow a single transmitting device to provide data to multiple receiving devices, the quality of data received by some receiving devices may be degraded. One quality of a signal is commonly measured using the signal-to-noise ratio ("SNR") of the signal at the receiving device. Another metric to measure the quality of received data is the bit error rate ("BER"). As the SNR becomes too low for a particular data signal, the BER associated with a receiving device may be too high for the receiving device. The SNR of a signal can be affected by the distance the signal must travel (for example, SNR can be degraded if a receiving device is located too far from a data transmitter). A SNR can be dependent on the power of the transmitted signal, assuming a sufficient SNR may be output by the data transmitter. The transmission power associated with a data signal transmitted to a particular receiving device may be too low. A signal may also be degraded due to interference from other data transmitters or other RF radiators.

A receiving device with a low SNR may request data at a lower bit rate from the data transmitter. More transmission time on the data channel can become reserved for transmitting data to the receiving device with the low SNR. Accordingly, other devices may not be able to access the data channel as needed. Furthermore, a transmission data rate for a particular data channel may be inadequate for a high-bandwidth receiving device. The data channel can be configured to transmit data at a maximum data rate, such as according to the IEEE 802.11 standard, or to a maximum data rate acceptable by a particular receiving device. A high-bandwidth receiving device may require a large amount of data; however, due to limitations configured into the data channel, the required amount of data may not be accessible to the high-bandwidth receiving device using the data channel.

Wireless communication signals are thus subject to various impairments that can cause the signal at the receiver to distort or fade significantly. As a result, wireless communication systems require signal processing techniques that improve the link performance in a hostile wireless radio environment. Diversity and channel coding are two techniques that can be used independently or in tandem to improve received signal quality and link performance over small-scale times and distances.

Diversity is a technique used to compensate for fading channel impairments and is usually implemented by using two or more receiving antennas. Spatial diversity of this sort improves the quality of a wireless communication link without altering the common air interface, and without increasing the transmitted power or bandwidth. An RF communication device may be subjected to fading phenomenon that introduce distortion into the received signal. These phenomena also increase the detrimental effect of additive noise on the received signal. Diversity is usually employed to reduce the depth and duration of the fades experienced by a receiver in a local area which are due to motion. Spatial diversity is the most common diversity technique, whereby multiple antennas are strategically spaced and connected to a common receiving system.

In a typical spatial diversity system, the multiple antennas provide reception paths that are employed to receive a common source signal. Signal processing hardware and software process the individual signals on the various reception paths, commonly referred to as diversity branches. The antennas are separated by a distance sufficient to ensure that the received signals have experienced uncorrelated fading a high proportion of the time when receiving energy from all directions. This distance is typically about 0.5 times the wavelength of the received signal. The probability that the received signals on all diversity branches are simultaneously experiencing deep fading is thus significantly less than the probability that any single received signal is experiencing a deep fade. With an appropriate combining algorithm, the multiple received signals can be combined such that the resultant combined signal is consistently of higher usability than any of the individual constituent signals.

Maximum ratio ("max ratio") combining is a well known method for combining the multiple signals in a diversity system. Max ratio combining adjusts the diversity branch signals so that they are in-phase, and weighted in proportion to their individual signal amplitude to noise power ratios, before combining the signals via summation. Max ratio combining produces an output SNR equal to the sum of the individual signal SNRs. Thus, it has the advantage of producing an output with an acceptable SNR even when none of the individual signals are themselves acceptable.

Channel coding is used to improve the small-scale link performance by adding redundant data bits in the transmitted message so that if an instantaneous fade occurs in the channel, the data may still be recovered at the receiver. At the baseband portion of the transmitter, a channel coder maps the user's digital message sequence into another specific code sequence containing a greater number of bits than originally contained in the message. The coded message is then modulated for transmission in the wireless channel.

Channel coding is used by the receiver to detect or correct some (or all) of the errors introduced by the channel in a particular sequence of message bits. Channel coding protects digital data from errors by selectively introducing redundancies in the transmitted data. Channel codes that are used to detect errors are called error detection codes, while codes that can detect and correct errors are called error correction codes. The basic purpose of error detection and error correction techniques is to introduce redundancies in the data to improve wireless link performance. The added coding bits lower the raw data transmission rate through the channel (coding expands the occupied bandwidth for a particular message data rate). This reduces the bandwidth efficiency of the link in high SNR conditions, but provides excellent BER performance at low SNR values.

There are three basic types of error detection and correction codes: block codes, convolutional codes, and turbo codes. Convolutional codes in particular are efficient at achieving a large coding gain. Coding gain is the main advantage provided by all error control codes. Coding gain describes how much better a user's decoded message performs as compared to the raw bit error performance of the coded transmission within the channel. Convolutional codes map a continuous sequence of information bits into a continuous sequence of encoder output bits.

A convolutional code is generated by passing the information sequence through a finite state shift register. In general, the shift register contains N k-bit stages and m linear algebraic function generators based on the generator polynomials as shown in FIG. 1. The input data is shifted into and along the shift register, k bits at a time. The number of output bits for each k bit user input data sequence is n bits. The code rate, $R_C$, is given by the equation $R_C=k/n$. The parameter N is called the constraint length and indicates the number of input data bits that the current output is dependent upon. The constraint length determines the power and complexity of the code.

Error correction codes are decoded at a receiver by a decoder. The function of the decoder is to estimate the encoded input information using a rule or method that results in the minimum possible number of errors. There is a one-to-one correspondence between the information sequence and the code sequence. Further, any information and code sequence pair is uniquely associated with a path through the encoder. A convolutional decoder thus estimates the path followed by the encoder. The most important method for decoding convolutional codes is the Viterbi algorithm. The Viterbi algorithm performs maximum likelihood decoding of a convolutional code. Maximum likelihood decoding means that the algorithm chooses the data sequence with the maximum probability of being correct (i.e., what data sequence is most likely to correspond to the actual transmitted signal).

A problem with implementing max ratio combining in a diversity receiving system, however, is that determining weights to apply to the individual diversity branch signals requires performing various multiplication and division functions. These functions are costly and complex to implement in the receiver circuitry. Further, when combining convolutional coding with max ratio combining, the Viterbi decoder used to decode the convolutional code requires taking the log of the determined error codes. Prior art methods that implement max ratio combining in tandem with convolutional decoding by means of the Viterbi algorithm thus require performing complex multiplication functions when combining the received diversity signals, and further require converting the determined error codes into the log domain to perform the Viterbi decoding. These prior art methods are therefore redundant, complex and costly to implement.

Therefore, a need exists for a method and apparatus for signal decoding in a diversity reception system with maximum ratio combining that can reduce or eliminate the problems associated with the prior art.

BRIEF SUMMARY OF THE INVENTION

The embodiments of the method and apparatus for signal decoding in a diversity reception system with maximum ratio combining of the present invention substantially meet these needs and others. One embodiment of a method for decoding a multiple received radio frequency (RF) signal in accordance with the present invention comprises: converting the multiple received RF signal into a plurality of digital baseband signals; phase aligning the plurality of digital baseband signals to produce a plurality of phase aligned digital baseband signals; determining a plurality of error terms from the plurality of phase aligned digital baseband signals, wherein one of the plurality of error terms has a corresponding one of the plurality of phase aligned digital baseband signals; determining a plurality of weighting factors for the plurality of error terms based on characteristics of the plurality of digital baseband signals, wherein one of the plurality of weighting factors has a corresponding one of the plurality of error terms; applying the plurality of weighting factors to the plurality of error terms to produce a plurality of weighted error terms; summing the plurality of weighted error terms to produce an error term; and decoding the error term to recapture data from the multiple received RF signal.

The characteristics of the plurality of digital baseband signals can include at least one of: a frequency response coefficient of each signal, a signal-to-noise ratio ("SNR") of each signal, a radio signal strength indicator ("RSSI") of each signal, a signal-to-interference ratio of each channel, and a signal-to-impairment ratio of each channel. Further, phase aligning the plurality of digital baseband signals comprises equalizing the plurality of digital baseband signals to generate a corresponding frequency domain equalization ("FEQ") coefficient for each of the plurality of digital baseband signals, wherein the FEQ coefficient is a value representing the degree of frequency equalization applied to its corresponding digital baseband signal. Equalizing the plurality of digital baseband signals can further comprise equalizing the amplitudes of the plurality of digital baseband signals. In this case, an FEQ coefficient is a value representing the degree of amplitude equalization and frequency equalization applied to its corresponding digital baseband signal.

The embodiments of the method of this invention can determine the plurality of weighting factors based on the FEQ coefficients. The plurality of weighting factors can be applied to the plurality of error terms in the log domain. Similarly, the FEQ coefficients can be converted to the log domain to indicate a shift amount in each of the plurality of error terms. The method of this invention can also determine a maximum ratio of each of the plurality of weighted error terms, and can determine the maximum ratio in the log domain.

The multiple received RF signal can comprise one carrier of a multiple carrier signal. The embodiments of the method of this invention can be performed for each carrier of the multiple carrier signal. The multiple carrier signal can be an orthogonal frequency division multiplexing ("OFDM") modulated signal. The multiple received RF signal can be received at a multiple switched diversity antenna structure. The method of this invention can further comprise receiving a plurality of multiple received RF signals, wherein each of the plurality of multiple received RF signals comprises the same data set, and selecting one of the plurality of multiple received RF signals for converting into the plurality of digital baseband signals. The embodiments of the decoding method of this invention can decode the error terms by means of a Viterbi decoder implementing a Viterbi decoding algorithm.

An embodiment of the present invention can comprise an apparatus for decoding a multiple received radio frequency (RF) signal. The apparatus can comprise a processing module and a memory operably coupled to the processing module, wherein the memory includes operational instructions that cause the processing module to perform one or more of the method steps described above. The embodiments of the method and apparatus for decoding a multiple received radio frequency (RF) signal of the present invention can thus reduce or eliminate the complexity, redundancy and high cost of prior art solutions. The various embodiments of the method and apparatus of this invention can be incorporated in a radio or other wireless communication device. Further, embodiments of this invention can be incorporated in a multimedia server that provides multiple data streams to a plurality of client modules.

BRIEF DESCRIPTION OF THE SEVERAL VIEWS OF THE DRAWINGS

FIG. 20 illustrates a schematic block diagram of an apparatus for signal decoding in a diversity reception system with maximum ratio combining in accordance with the present invention; and FIG. 21 is a logic diagram of a method for decoding a multiple received RF signal with maximum ratio combining in accordance with the present invention.

DETAILED DESCRIPTION OF THE INVENTION

Figure 1:
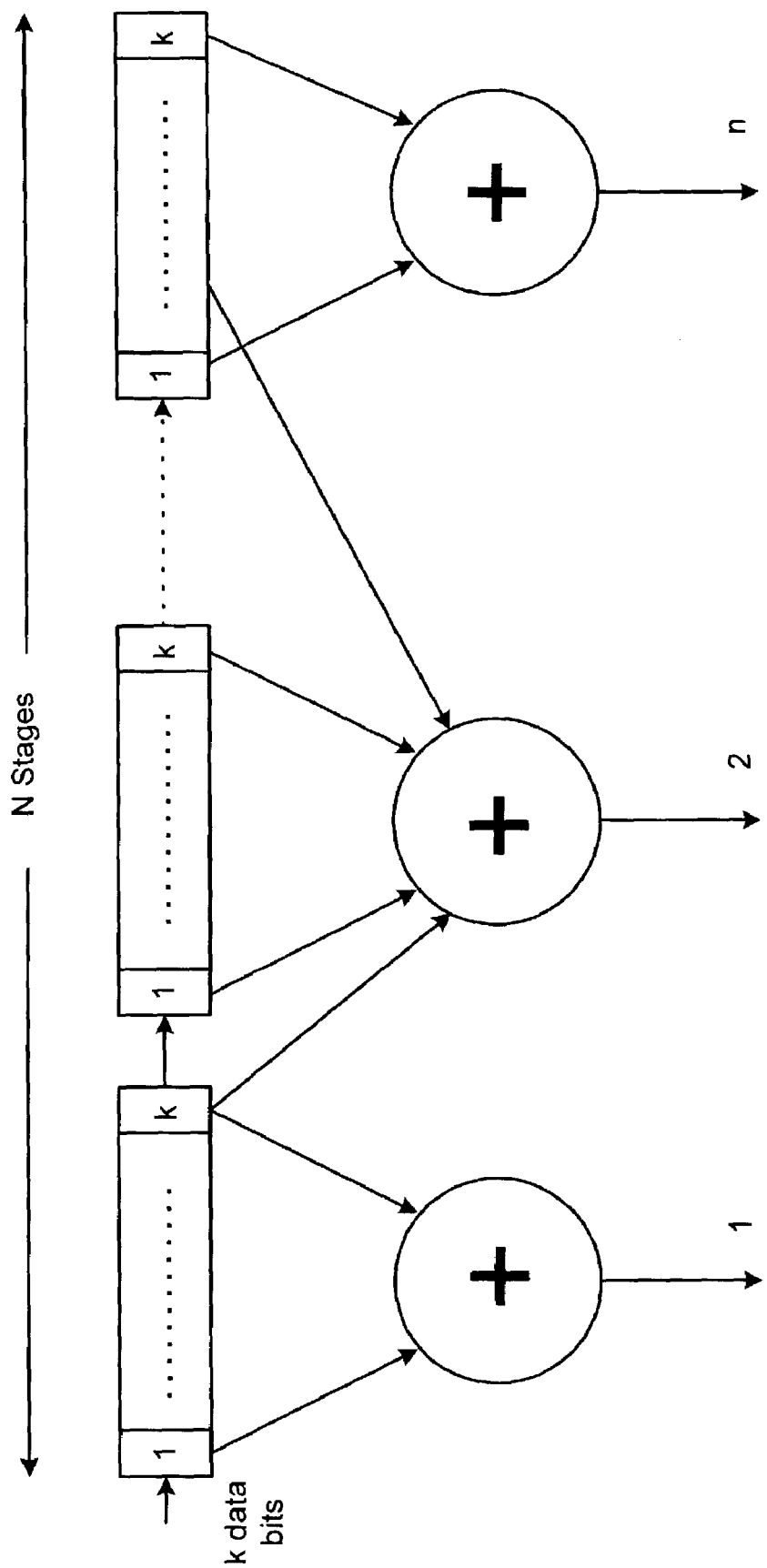
FIG. 1 is a general block diagram of a convolutional encoder.
Figure 2:
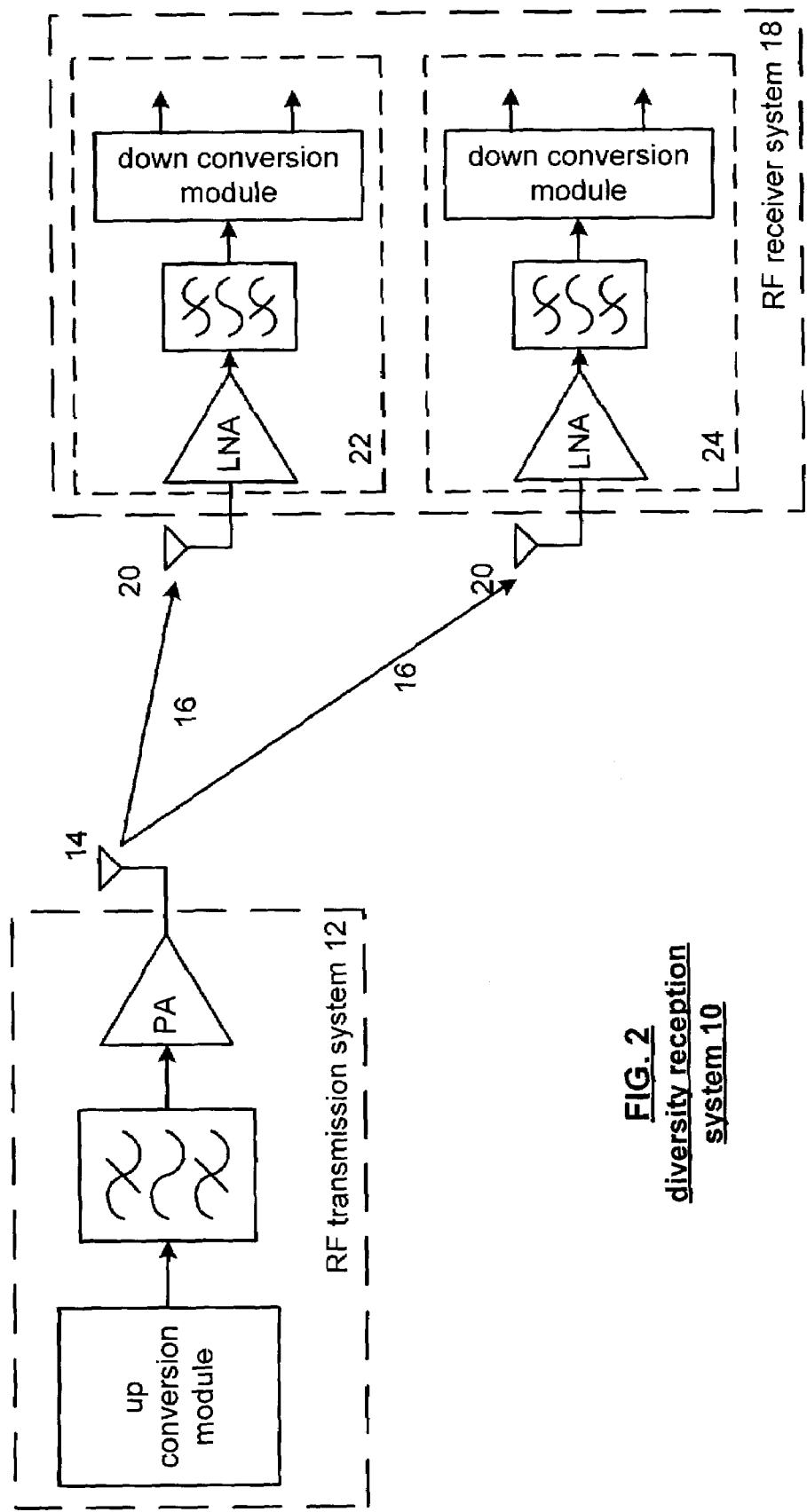
FIG. 2 is a high-level block diagram illustrating a generic diversity reception system 10, such as can be used to implement the various embodiments of the present invention.

The present invention can be more fully described with reference to FIGS. 2 through 21. FIG. 2 is a high-level block diagram illustrating a generic diversity reception system 10, such as can be used to implement the various embodiments of the present invention. Diversity reception system 10 can be any diversity reception system as known to those familiar with the art. Diversity reception system 10 comprises a radio frequency ("RF") transmission system 12, which can be any RF transmission system as known in the art, comprising an antenna 14 used to transmit data along RF channel 16. Diversity reception system 10 also includes an RF receiver system 18 for receiving the data transmitted on RF channel 16. Receiver system 18 can be any type RF diversity receiver system as known in the art and comprises, in this example, dual antennas 20 for receiving the data signal transmitted on RF channel 16. Dual antennas 20 each provide a separate version of the received data signal to their respective receiver sections 22 and 24 for processing and recovery of the data transmitted over RF channel 16. Processing and recovery of the transmitted data signal can be accomplished in accordance with the teachings of this invention as disclosed in detail below.

Figure 3:
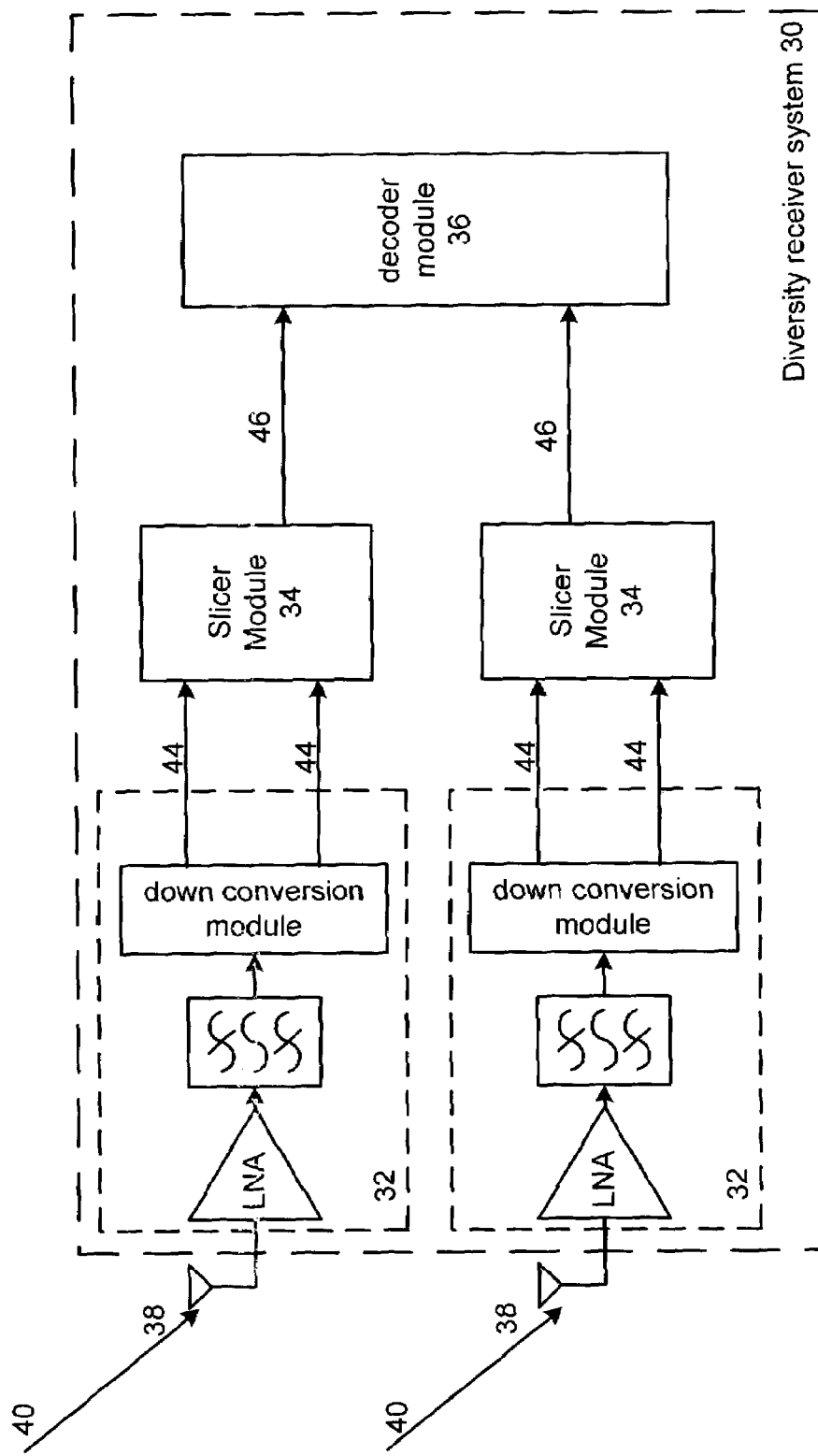
FIG. 3 is a more detailed block diagram of a diversity receiver system, such as receiver system 18 of FIG. 2, for implementing an embodiment of the method and apparatus of this invention.

FIG. 3 is a more detailed block diagram of a diversity receiver system, such as receiver system 18 of FIG. 2, for implementing an embodiment of the method and apparatus for signal decoding in a diversity reception system of this invention. Diversity receiver system 30 comprises dual receive paths 32, slicer modules 34 and a decoder module 36. Dual receive paths 32 implement the diversity reception aspect of the present invention. Each receive path 32 includes an antenna 38 for receiving an incoming multiple received RF data signal 40, which can be an orthogonal frequency division multiplex (OFDM) signal. The multiple received RF data signal 40 can correspond to a channel of data within an RF channel spectrum. Each multiple received RF data signal 40 can have differing characteristics because of the different path taken by each signal to reach its respective antenna 38. Each of these components may be implemented as discrete integrated circuits, all within one integrated circuit or any combination thereof.

The multiple receive paths 32 thus provide reception paths that are employed to receive a common source signal (multiple received RF data signal 40). Receive paths 32 include signal processing hardware and software to process the individual data signals 40 on its respective reception path, commonly referred to as a diversity branch. The signal processing of multiple received RF data signal 40 is described in detail below. The antennas 38 are separated by a distance sufficient to ensure that the multiple received RF data signals 40 have experienced uncorrelated fading a high proportion of the time. This distance is typically about 0.5 times the wavelength of the received signal. The probability that the received signals on all diversity branches are simultaneously experiencing deep fading is thus significantly less than the probability that any single received signal is experiencing a deep fade. With an appropriate combining algorithm, such as the max ratio combining algorithm of this invention, the multiple received data signals 40 can be combined such that the resultant combined signal is consistently of higher usability than any of the individual constituent signals.

Processing of each multiple received RF data signal 40 along its respective receive path 32 comprises converting the multiple received RF data signal into a plurality of digital baseband signals and phase aligning the plurality of digital baseband signals to produce a plurality of phase aligned digital baseband signals, as is explained more fully below. Each receive path 32 is operably coupled to a slicer module 34. Slicer modules 34 each receive the plurality of phase aligned digital baseband signals 44 from both receive paths 32 and determine a plurality of error terms from the plurality of phase aligned digital baseband signals 44, wherein each of the plurality of error terms has a corresponding one of the plurality of phase aligned digital baseband signals 44. Further, each slicer module 34 is operably coupled to determine a plurality of weighting factors for the plurality of error terms based on characteristics of the plurality of digital baseband signals 44, wherein each of the plurality of weighting factors has a corresponding one of the plurality of error terms, and applying the plurality of weighting factors to the plurality of error terms to produce a plurality of weighted error terms. Slicer modules 34 each then sum the plurality of weighted error terms to produce an overall error term 46. Each slicer module 34 provides its corresponding overall error term 46 to decoder module 36. Decoder module 36 is operably coupled to decode recombine and decode the overall error terms 46 to recapture data from the multiple received RF data signal 40.

Figure 4:
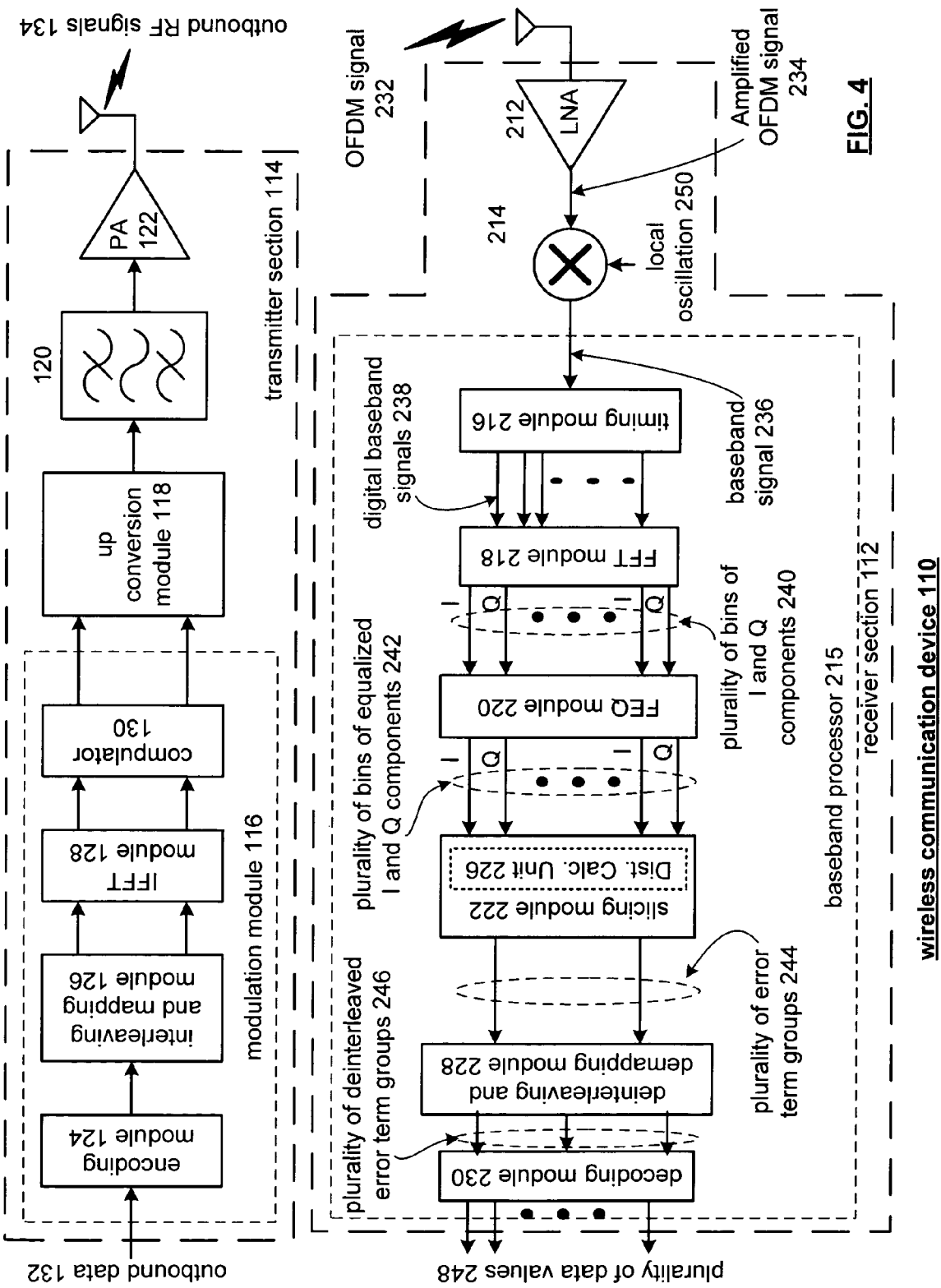
FIG. 4 is a schematic block diagram illustrating a radio transmitter and receiver in accordance with the present invention.

FIG. 4 illustrates a schematic block diagram of a wireless communication device 110 that includes a receiver section 112 and a transmitter section 114. The transmitter section 114 includes a modulation module 116, an up conversion module 118, bandpass filter 120, and a power amplifier 122 that is coupled to an antenna. The modulation module 116 may include an encoding module 124, interleaving and mapping module 126, an inverse fast Fourier transform module 128 and a compulator 130.

In operation, the transmitter section 114 receives outbound data 132 via the encoding module 124 of the modulation module 116. The outbound data 132 may be digitized voice transmissions, data transmissions, and/or any other type of information that may be communicated over a wireless communication channel. The encoding module 124 encodes the outbound data 132 in accordance with a particular wireless communication standard. For instance, for the IEEE 802.11a standard, the encoding includes scrambling, convolutional encoding, and data compression. The interleaving and mapping module 126 receives the encoded data and interleaves and maps the data to particular constellation symbols: one symbol per sub-carrier of a channel. Each symbol includes an I and a Q component. The inverse fast Fourier transform module 128 converts the I and Q components for each of the symbols from the frequency domain to the time domain to produce a plurality of time domain magnitudes and phases, i.e., time domain symbol components.

The compulator 130 receives the plurality of time domain symbol components and converts them into a baseband analog signal that is provided to the up conversion module 118. For example, if the wireless communication device 110 is compliant with the IEEE 802.11a standard, the inverse fast Fourier transform module is converting sixty-four I and Q components, which represent sixty-four symbols, into sixty-four time domain symbol components. Of the sixty-four symbols, only fifty-two are used of which forty-eight carry data and four are pilot signals. The compulator 130 combines the sixty-four time domain symbol components (i.e., magnitudes and phases) into the baseband analog signal that is provided to the up conversion module 118.

The up conversion module 118 converts the baseband analog signal received from the compulator 130 into a radio frequency (RF) signal by mixing the baseband analog signal with one or more local oscillations in one or more stages. Bandpass filter 120 filters the radio frequency signal and provides the filtered RF signal to the power amplifier 122. The power amplifier 122 increases the energy of the RF signal such that it may be transmitted as an outbound RF signal 134 via the antenna.

The receiver section 112 includes a low noise amplifier 212, mixing module 214 and a baseband processor 215. The baseband processor 215 includes a timing module 216, a fast-fourier-transform (FFT) module 218, frequency domain equalizing (FEQ) module 220, a slicing module 222, a de-interleaving module 228, and a decoding module 230. Each of these components may be implemented as discrete integrated circuits, all within one integrated circuit or any combination thereof.

Figure 5:
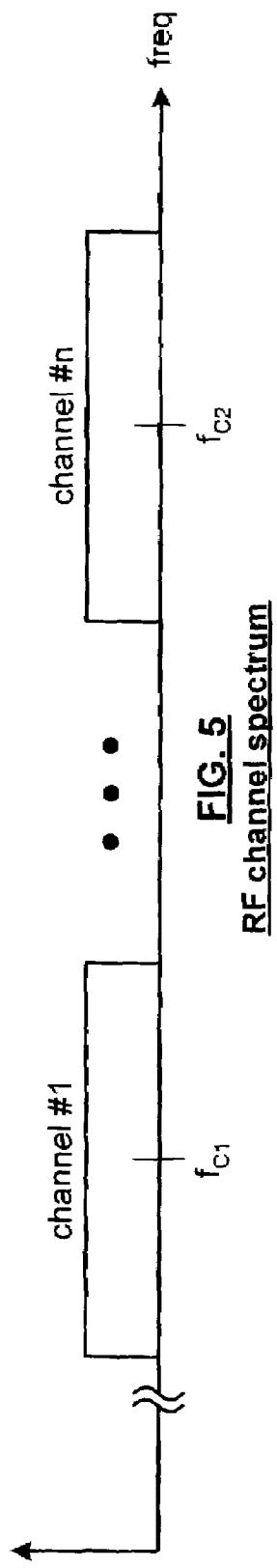
FIG. 5 is a frequency domain representation of a radio frequency channel spectrum in accordance with the present invention.
Figure 6:
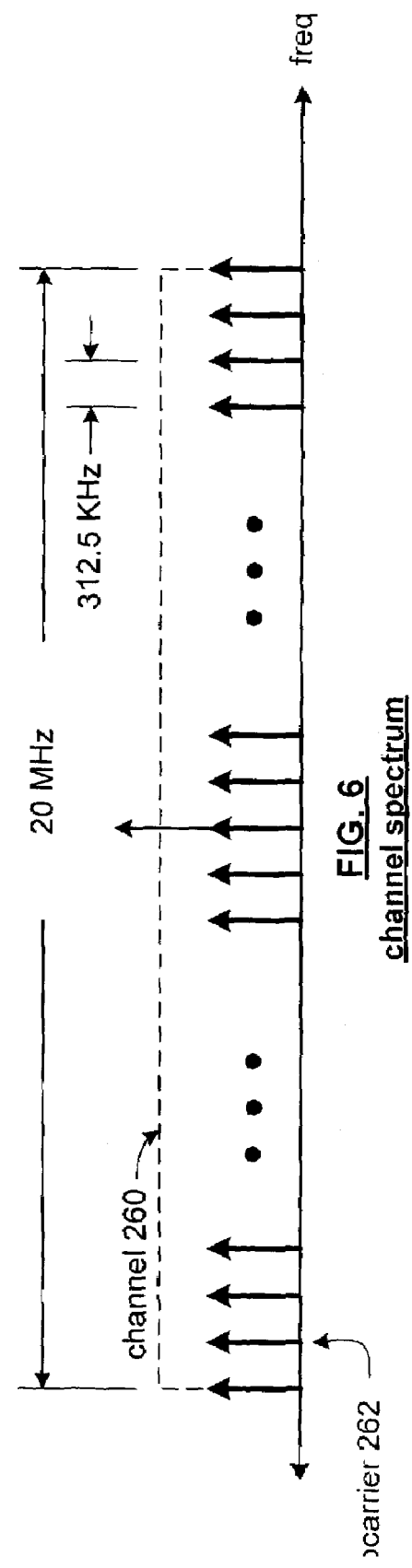
FIG. 6 is a frequency domain representation of a channel in accordance with the present invention.

In operation, the low noise amplifier 212 receives an orthogonal frequency division multiplex (OFDM) signal 232. The OFDM signal 232 corresponds to a channel of data within an RF channel spectrum. With reference to FIGS. 5 and 6, an RF channel spectrum for an IEEE802.11 a compliant system includes a plurality of channels (channel No. 1 through channel No. N). Each of these channels is centered at a carrier frequency that may be in the range of 5.15-5.35 gigahertz and 5.725-5.825 gigahertz. FIG. 6 illustrates the frequency components of a single channel of the plurality of channels shown in FIG. 5. As shown, the channel 260 is approximately 20 megahertz wide and includes a plurality of sub-carrier 262 (e.g., 64 sub-carriers). Each sub-carrier is a unique sinusoidal signal having a particular amplitude and phase offset that represents encoded data. Each of the sub-carriers is spaced by approximately 312.5 kilohertz.

Returning to the discussion of FIG. 4, the low noise amplifier 212 amplifies the OFDM signal 232, which may be as described with referenced to FIGS. 5 and 6, to produce an amplified OFDM signal 234. The mixing module 214 mixes the OFDM signal 234 with a local oscillation 250 to produce a baseband signal 236. The mixing module may include one or more intermediate frequency stages wherein the local oscillation 250 corresponds to an intermediate frequency or the RF frequency. The resulting baseband signal 236 is a composite of sine waves, where each sine wave corresponds to a sub-carrier 62 of the OFDM signal 234.

The timing module 216 receives the baseband signal 236 and converts it into a plurality of digital baseband signals 238. In essence, the timing module 216 converts the baseband sine waves into time domain digital I and Q components, which correspond to magnitudes and phases of the corresponding sine waves. The result is a digital baseband signal that includes a digital time domain I and Q component for each subcarrier.

The FFT module 218 receives the digital baseband signals 238 and converts the time domain I and Q components of each sub-carrier into frequency domain I and Q components. The result is a plurality of bins of I and Q components 240. Each bin corresponds to the frequency domain representation of a sub-carrier of the OFDM channel. For an IEEE 802.11a compliant system, the FFT module 218 outputs 64 bins of I and Q components, each bin corresponding to one of the 64 sub-carriers of the OFDM channel.

The frequency equalization (FEQ) module 220 receives the plurality of bins of I and Q components 240 (the plurality of digital baseband signals) and filters them to produce a plurality of bins of equalized I and Q components 242. In general, the frequency equalization module 220 has a transfer function that corresponds to the inverse of the RF channel on which the OFDM signal 232 is received. As such, the frequency-equalizing module 220 is effectively removing the adverse affects caused by the RF channel. The FEQ module 220 receives the plurality of bins of I and Q components and individually compensates them for droop caused by the receiver section 112 and compensates them for phase, frequency, and/or amplitude offsets caused by the transmission characteristics of the RF channel. As one of average skill in the art will appreciate, a bin contains one symbol (or symbol components) and when modulated is transmitted via one sub-carrier of a channel. For a more detailed discussion of a frequency equalizing module 220 refer to co-pending patent application, which is assigned to the same assignee as the present patent application, and is entitled DIGITAL DEMODULATION UTILIZING FREQUENCY EQUALIZATION, having a filing date of Apr. 15, 2002, and a serial number of Ser. No. 10/122,784.

Slicing module 222 receives the plurality of equalized I and Q components 242 and produces a group of error terms 244 based on the corresponding equalized I and Q components 242. The group of error terms produced by slicing module 222 includes a specific number of error terms that correspond to the constellation mapping used to encode the data on each of the sub-carriers of the OFDM signal 232. For instance, if the data was encoded using QPSK, slicing module 222 would produce two error terms per bin; for 16 QAM, slicing module 222 would produce four error terms per bin and, for 64 QAM, slicing module 222 would produce six error terms per bin.

Slicer module 222 can be a soft slicing module. Soft-decision decoding can add about 3 dB of performance but requires the use of a distance calculation unit 226, as shown, incorporated within slicer module 222. Soft-decision decoding can increase the performance of receiver section 212 on fading channels. FEQ module 220 can phase align the plurality of digital baseband signals (the plurality of bins of I and Q components 242) by equalizing the plurality of digital baseband signals 238 to generate a corresponding FEQ coefficient for each of the plurality of digital baseband signals 238, wherein the FEQ coefficient is a value representing the degree of frequency equalization applied to its corresponding digital baseband signal 238. Equalizing the plurality of digital baseband signals 238 can further comprise equalizing the amplitudes of the plurality of digital baseband signals 238, wherein the FEQ coefficient is a value representing the degree of amplitude equalization and frequency equalization applied to its corresponding digital baseband signal 238. For soft-decision decoding, the distance calculation unit 226 uses the FEQ coefficients to calculate weighted distances.

The de-interleaving module 228 receives the plurality of error term groups 244 and de-interleaves them to produce a plurality of de-interleaved error term groups 246. The manner in which the error terms are de-interleaved is based on the manner in which the symbols of the OFDM signal 232 were interleaved. This is described in detail with reference to FIGS. 7-10.

The decoding module 230 receives the plurality of de-interleaved error term groups 246 and generates therefrom branch metrics. From the branch metrics, the decoding module 230 produces a plurality of data values 248. Each data value 248 corresponds to the data encoded within a particular sub-carrier. As such, for IEEE 802.11a, there will be up to 64 data values produced, one corresponding to each of the sub-carriers. The type of decoding performed by decoding module 230 may be one-half rate Viterbi decoding. In addition, the decoding module 230 may include a depuncture process to remove the puncturing (i.e., compression) of the data performed within the transmitter that transmitted the OFDM signal 232.

The deinterleaving module 228 receives the plurality of error term groups 244 and deinterleaves them to recapture encoded data. The decoding module 230 decodes the encoded data to produce the plurality of data values 248. As such, the deinterleaving module 228 and decoding module 230 are performing the inverse functions as those performed by the interleaving and mapping module 126 and the encoding module 124 of the transmitting section 114 of the radio that transmitted the OFDM signal 232.

The Viterbi decoder module 230 implements a Viterbi decoding algorithm. The Viterbi algorithm is a preferred method of decoding error-correction convolutional codes such as are used in the IEEE 802.11 standard. The Viterbi algorithm is a maximum likelihood decoder in the sense that it chooses the sequence with the maximum probability of being correct. Given a rate k/n code, where n is the number of output bits for each k bit user input data sequence, assume that an information sequence $u=(u_0, u_1, \ldots, U_{L-1})$ of length kL is encoded into a code word $v=(v_0, v_1, \ldots, v_{L+m-1})$ of length $N=n(L+m)$ and that a Q-ary sequence $r=(r_0, r_1, \ldots, r_{L+m-1})$ is received over a binary input, Q-ary output discrete memoryless channel ("DMC"). The Viterbi algorithm chooses v' as the code word that maximizes the log-likelihood function:

$$\ln P(r|v) = \sum_{i=0}^{L+m-1} \ln P(r_i|v_i) = \sum_{i=0}^{N-1} \ln P(r_i|v_i) \qquad \text{Equation 1}$$

The terms $\ln P(r_i|v_i)$ are called bit metrics;

$$\sum_{i=0}^{L+m-1} \ln P(r_i|v_i)$$

is the path metric. The process of computing the bit metrics and path metric is well known in the art.

The Viterbi decoder module 230 of this invention weights the bit metrics with the channel frequency response of the corresponding bin, $|F(f)|^{-1}$, where F(f) is the frequency response of the FEQ. Using these weightings, a deep fade in the channel is effectively ignored in the Viterbi decoder module 230. The Viterbi decoder module 230 of this invention has four weighting modes:
 1. Channel 1 only: y=y1/n1; where n1=$|F_1(f)|$
 2. Channel 2 only: y=y2/n2; where n2=$|F_2(f)|$
 3. Max ratio diversity: y=(n2*y1+n1*y2)/(n1+n2)
 4. Weighted max ratio: y=[(n2*y1+n1*y2)/(n1+n2)]*[(1/n1+1/n2)/2] or, y=(y1/n1+y2/n2)/2

However, the circuitry for performing the division and multiplication functions required to determine these weightings is difficult and costly to implement. The embodiments of this invention eliminate the need for multipliers and dividers by estimating the weightings in the log domain, in particular, based on log 2. By performing the weighting of the error terms in the log domain, the embodiments of this invention allow the use of adders in place of multipliers and dividers, making for a simpler and less costly circuit implementation.

For a single receiver (receive path), the signal provided to the Viterbi decoder module 230 is $y=y1/n1=w1*y1$, where y1 is a vector of error signals d0 (distance to 0) and d1 (distance to 1). This concept is more fully explained with reference to FIGS. 7-11, and is known in the art. Taking the log 2 of w1 provides: $\log 2(w1)=-\log 2(n1)$. If $\log 2(w1)$ is truncated to the nearest integer, right shifts can weight the signal y1 in steps of 6 dB. Trunc(log 2(w1)) can be accomplished by looking at the left-most binary 1 of w1. Finer resolution can be accomplished by looking at the bit to the right of the first binary 1. For example, if the bit to the right of the left-most bit is set, the noise signal is 3 db higher (see the log 2(x) Table 1 below), and the subtract 3 db flag is asserted. In this case, the error signal is weighted by $1/\text{sqrt}(2)=0.707$, which can be approximated as 0.75 to effectively subtract approximately 3 db. Thus, the distance calculation unit of the slicer module 236 can weigh in 3 dB increments.

The various embodiments of the present invention provide the capability for performing max ratio combining of the multiple received RF signals. Max ratio combining is a well-known method for combining the multiple signals in a diversity system. Max ratio combining adjusts the diversity branch signals so that they are in-phase, and weighted in proportion to their individual signal amplitude to noise power ratios, before combining the signals via summation. Max ratio combining produces an output SNR equal to the sum of the individual signal SNRs. Thus, it has the advantage of producing an output with an acceptable SNR even when none of the individual signals are themselves acceptable.

The same weighting estimates described above for the single receiver case can be applied to a diversity reception system as per the teachings of the present invention. Thus, the same weighting estimates can be applied to the max ratio modes described above. For example, the standard max ratio mode combines the vectors y1 and y2 by $y=(n2*y1+n1*y2)/(n1+n2)=w1*y1+w2*y2$. Taking the log 2 of w1 and of w2 yields: $\log 2(w1)=\log 2(n2)-\log 2(n1+n2)=-(\log 2(n1+n2)-\log 2(n2))$; and $\log 2(w2)=\log 2(n1)-\log 2(n1+n2)=-(\log 2(n1+n2)-\log 2(n1))$. In this case, y1 is weighted by $(-6 \text{ dB})*(\text{trunc}(\log 2(n1+n2))-\text{trunc}(\log 2(n2)))+(-3 \text{ db})*(\text{tden1}-\text{tnum1})=(-6 \text{ db})*s1+(-3 \text{ dB})*(\text{tnum1}-\text{tden1})$, where tnum1 and tden1 are the subtract 3 db flags out of the log 2(n2) and log 2(n1+n2) logic blocks, respectively. Y2 is weighted in the same manner.

Table 1 below shows how the add_3 db and sub_3 db signals are obtained from tnum1 and tden1. The add_3 db can be accomplished by adding 6 db and subtracting 3 db. If the add$_{13}$ 3 db signal is asserted and (den-num) is equal to zero, then s1 must saturate at 0 and t1 should be 0.

TABLE 1

| tnum | tden | add_3db | sub_3db |
|------|------|---------|---------|
| 0 | 0 | 0 | 0 |
| 0 | 1 | 0 | 1 |
| 1 | 0 | 1 | 0 |
| 1 | 1 | 0 | 0 |

The embodiments of this invention can thus weight the determined error terms in the log domain to deemphasize any impairment to the transmitted OFDM signal 232 incurred from its transmission from the transmitting device to reception by the receiver section 112. By weighting the error terms the embodiments of this invention are able to take advantage of the processing of the OFDM signal 232, which breaks down the received signals into a plurality of digital baseband signals and determines an error term for each of the plurality of digital baseband signals. Further, by performing the weighting in the log domain, the complex and costly circuitry required to perform multiplication and division functions is eliminated.

The Viterbi decoder module 230 further comprises a recombination circuit to add the diversity paths together. The signal to the Viterbi decoder module 230 can be divided by two in the case of weighted max ratio combining. This is so that the same branch and state metrics can be used in the Viterbi decoder module 230 for any of the four weighting modes.

Figure 7:
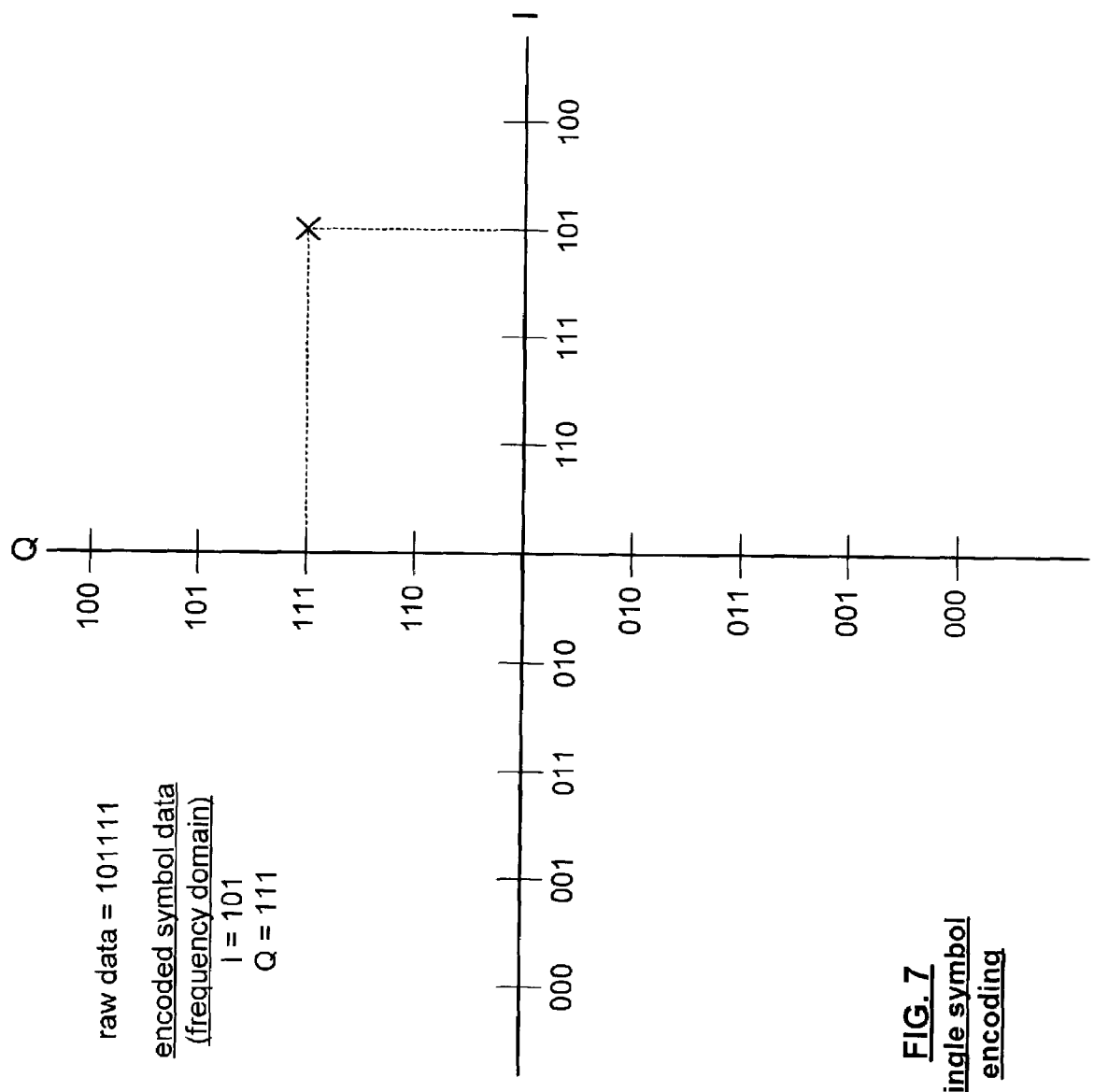
FIG. 7 is an example of mapping raw data to a constellation point in accordance with the present invention.

FIG. 7 is a graphical representation illustrating 64 QAM symbol encoding of raw data. In this example, the raw data is a 6-bit value of 101 111. The encoded symbol data, in the frequency domain has an I component of 101 and a Q component of 111. Thus, mapping this particular raw data to the 64 QAM constellation map places the symbol at the X as shown. This encoding is done for 48 of the 64 sub-carriers that support data. As such, with the encoding process in the transmitter, 48 sets of raw data are encoded to produce 48 symbols that eventually comprise the OFDM signal 232.

Figure 8:
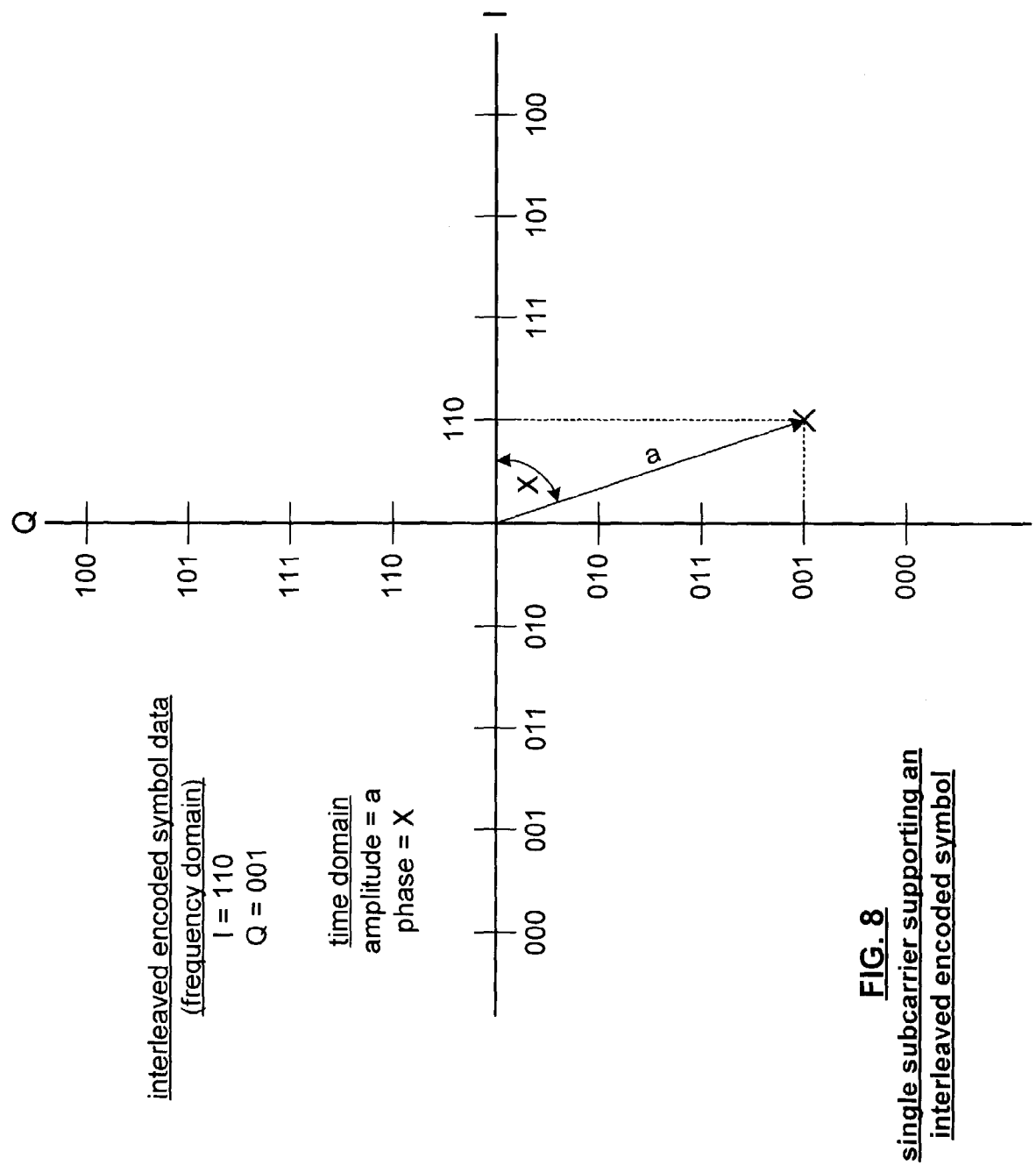
FIG. 8 is a time domain representation of an example of converting an interleaved encoded symbol data from the frequency domain to the time domain in accordance with the present invention.

FIG. 8 illustrates a graphical representation of a single sub-carrier supporting an interleaved encoded symbol. In this example, the frequency domain representation of an interleaved encoded symbol has an I component of 110 and a Q component of 001. Such a symbol maps to the X position as shown in FIG. 7. The time domain representation of this interleaved encoded symbol has an amplitude "a" and a phase X. The interleaved encoded symbol as well as the use of the time domain representation thereof will be described in detail with reference to FIGS. 9 and 10.

Figure 9:
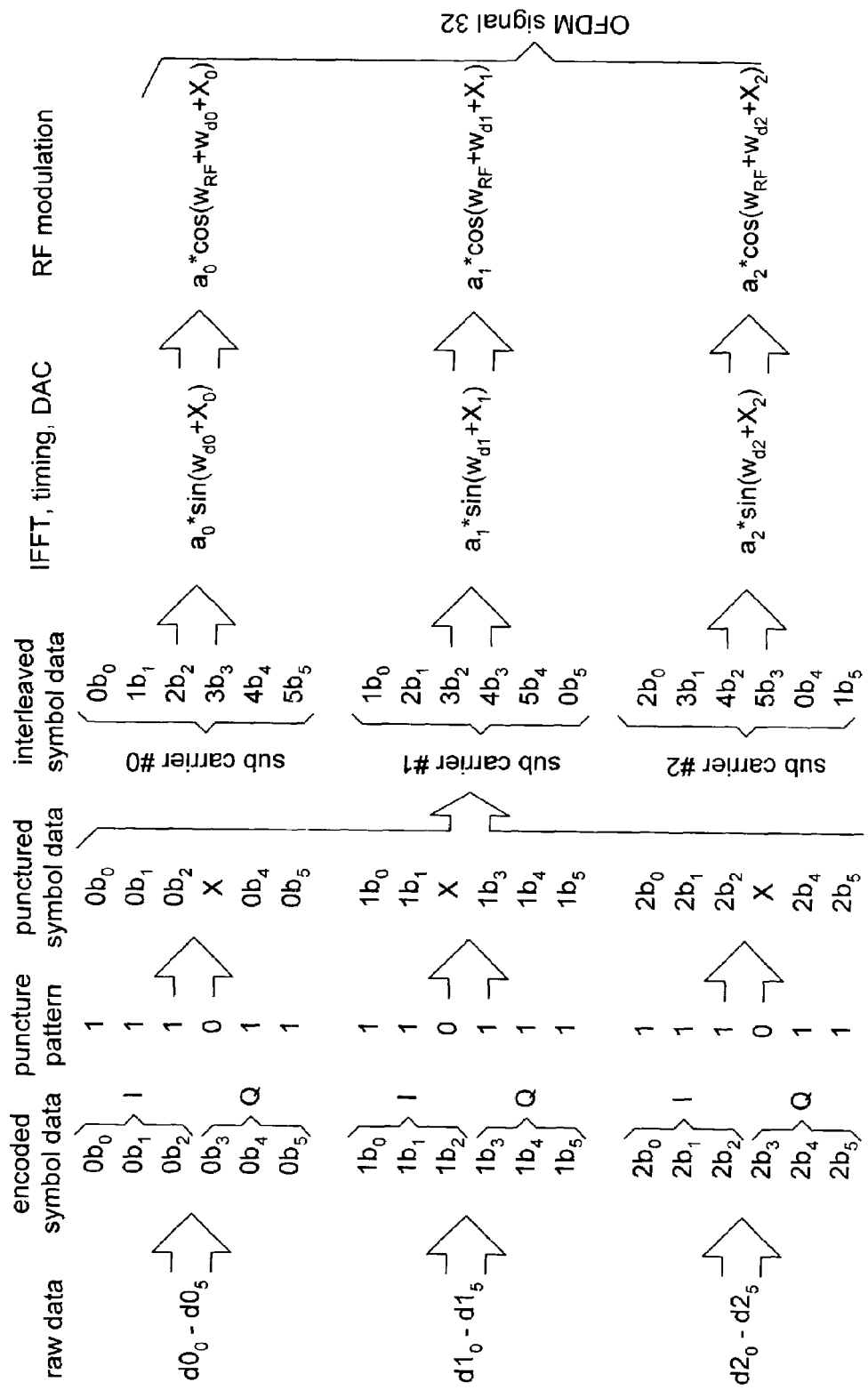
FIG. 9 is a graphical representation of a transmission process for a 64 QAM OFDM signal in accordance with the present invention.

FIG. 9 illustrates a graphical representation of the transmission process for a 64 QAM OFDM signal. The processing of raw data proceeds from the left of the figure to the right of the figure. Accordingly, there are 48 sets of raw data that are to be encoded to produce encoded symbol data. Of the 48, the first three are illustrated in FIG. 9. As shown, the first set of bits of raw data ($d0_0$-$d0_5$) is encoded into a particular symbol. The encoded symbol includes three bits for an I component ($0b_0$-$0b_2$) and three bits for a Q component ($0b_3$-$0b_5$).

The $2^{nd}$ set of bits of raw data (e.g., $d1_0$-$d1_5$) is converted into an encoded symbol. The corresponding encoded symbol includes three bits of an I component ($1b_0$-$1b_2$) and three bits for a Q component (e.g., $1b_3$-$1b_5$). The $3^{rd}$ set of bits of raw data (e.g., $d2_0$-$d2_5$) is converted into an encoded symbol having three bits for an I component (e.g., $2b_0$-$2b_2$) and three bits for a Q component (e.g., $2b_3$-$2b_5$).

The next column corresponds to a puncture pattern, which compresses the data of the encoded symbols. The puncture pattern includes primarily 1's and an occasional 0. The positioning of the 0's may be in accordance with the puncture pattern prescribed in the IEEE 802.11a standard. As such, once the encoded symbol data is punctured, wherever the puncture pattern included a 0, the punctured symbol is deleted. In this example, the $4^{th}$ bit of the $1^{st}$ encoded data symbol is deleted, the $3^{rd}$ bit of the $2^{nd}$ encoded data symbol is deleted, and the $4^{th}$ bit of the $3^{rd}$ encoded data symbol is deleted.

The punctured symbol data is then interleaved onto various sub-carriers. The interleaving pattern may be in accordance with the IEEE802.11 standard or a proprietary interleaving scheme. The interleaving shown in FIG. 8 is presented to provide an example of how the interleaving functions. As shown, each sub-carrier includes bits of the punctured symbol data from various encoded symbols. For example, sub-carrier 0 may include bit 0 of the $1^{st}$ punctured symbol, bit 1 from the $2^{nd}$ punctured symbol, bit 2 from the $3^{rd}$ punctured symbol (e.g., $2b_2$), bit 3 from the $4^{th}$ punctured symbol (e.g., $3B_3$), et cetera. Each sub-carrier will have an interleaved pattern of bits from various punctured symbols. By interleaving the data in this manner, the ability to accurately recapture data by receiver is enhanced since, even if one or more of the sub-carriers have a significant amount of interference, others will not. For example, if an encoded symbol were fully placed on one sub-carrier, and that sub-carrier had a significant amount of interference, the symbol would be distorted beyond the receiver's ability to accurately recapture the raw data. However, by having bits of each of the symbols in various sub-carriers, if one sub-carrier has a substantial amount of interference, a majority of the encoded symbol data is still accurately received by the receiver via the sub-carriers with less interference. Accordingly, the sub-carriers that have a higher signal-to-noise ratio may have a weighting factor that is greater than other sub-carriers with a lower signal-to-noise ratio. This, as will be explained later, further enhances the receiver's ability to accurately decode the data.

The next column within the transmission process corresponds to an inverse fast-fourier-transform (IFFT) and timing and DAC (Digital to Analog Conversion). The inverse fast-fourier-transform converts the frequency domain interleaved symbol data to the time domain. This was graphically illustrated in FIG. 8. The time and DAC function takes the amplitude and phase shift corresponding to the frequency domain representation of the interleave symbol and produces a corresponding sine wave. As shown, for sub-carrier 0, the sine wave has an amplitude of $a_0$ and a frequency offset of $X_0$. The $w_{d0}$ corresponds to the individual frequency of the data, i.e., the frequency of the sub-carrier. As previously mentioned with reference to FIG. 6, each sub-carrier is separated from the others by 312.5 kilohertz. As such, $w_{d1}$ equals $w_{d0}$ plus 312.5 KHz, $w_{d2}$ equals $w_{d1}$ plus 312.5 KHz, etc. The IFFT function and timing/ADC function produce a sine wave for the $1^{st}$ sub-carrier, the $2^{nd}$ sub-carrier and all remaining sub-carriers of the 64 within a particular channel.

The RF modulation function mixes the sinusoid waveforms of the sixty-four sub-carrier, which are at baseband, with a radio frequency (RF) carrier frequency. The resulting signals are cosine waveforms having the same amplitude and frequency offset as their corresponding baseband sine waveforms, but at a much higher frequency rate. The 64 modulated sub-carriers comprise the OFDM signal 232.

Figure 10:
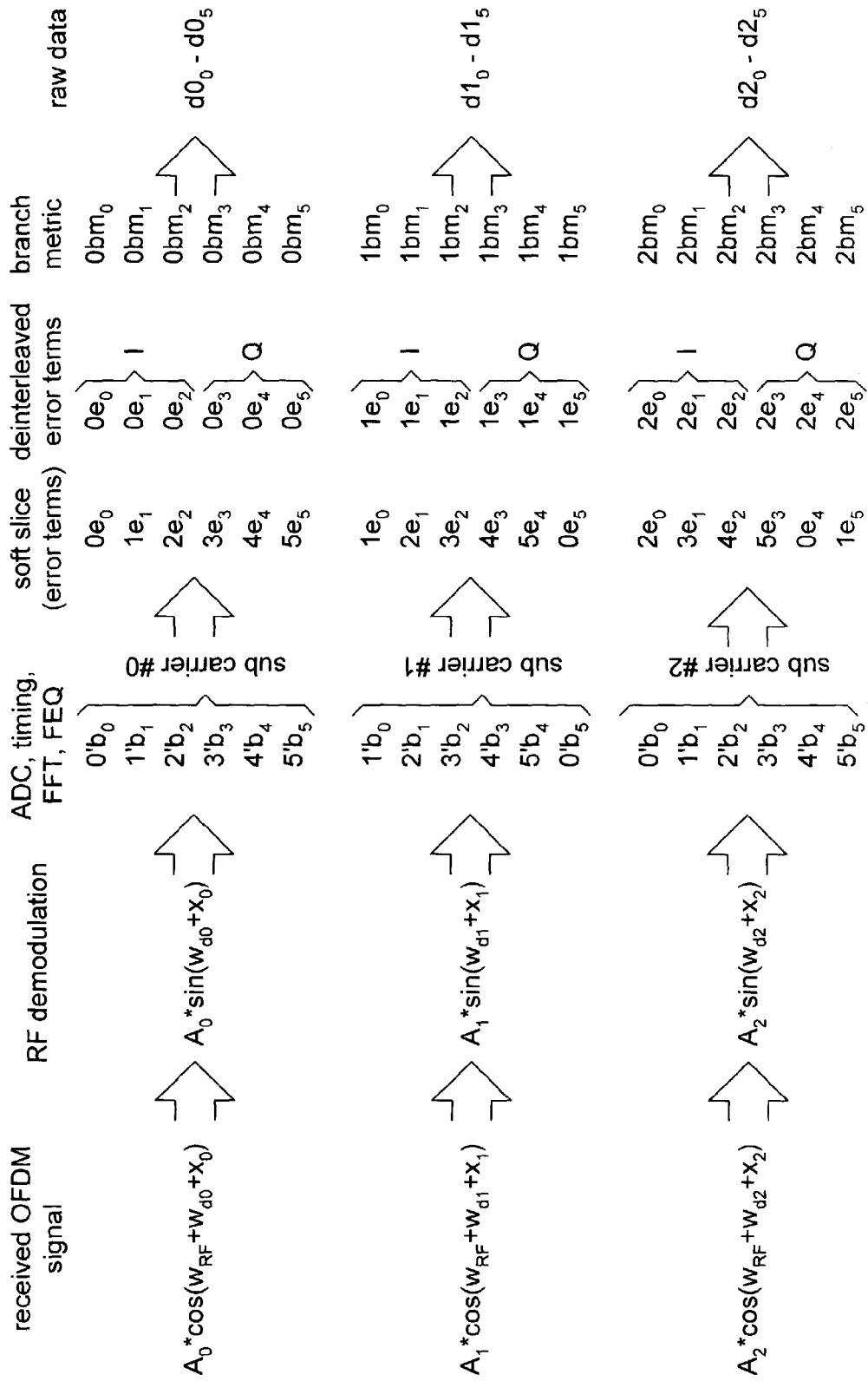
FIG. 10 is a graphical representation of the receiving process for a 64 QAM OFDM signal in accordance with the present invention.

FIG. 10 illustrates a graphical representation of the receiving process of a 64 QAM OFDM signal. As shown, the received OFDM signal includes a plurality of cosine waveforms, each having a corresponding amplitude (e.g., $A_0$, $A_1$, $A_2$, etc.) and a corresponding phase offset (e.g., $x_0$, $x_1$, $x_2$, etc.). The amplitude and frequency offset for each of the cosine waveforms are not identical to the corresponding amplitudes and phase offsets transmitted, which was illustrated in FIG. 9. The difference between the amplitudes and phases is based on the gain and frequency response of the channel carrying the OFDM signal.

The next column corresponds to the RF demodulation process. The RF demodulation process mixes the cosine wav forms of the received OFDM signal with a local oscillation to produce baseband sine waveforms having the corresponding amplitude and phase offset.

The timing and ADC, FFT, and frequency equalization (FEQ) functions produce an estimated frequency domain representation of the data embedded within each of the sinusoidal signals. As illustrated in FIG. 8, the amplitude and phase of a signal can be mapped to a particular constellation point. As such, the decompilation, FFT and FEQ process produces a 6-bit representation of the interleave symbol that was transmitted on the sub-carrier number 0. Similarly, a recaptured interleave symbol is produced for each of the remaining sub-carriers.

The slicing module 220 receives the estimated interleave symbol from the decompilation, FFT and FEQ process and produces six error terms per bin (for 64 QAM). Each error term corresponds to the particular bit location within the interleave symbol. For example, as shown, the $1^{st}$ soft slicing function produces six error terms $0e_0$, $1e_1$, $2e_2$, $3e_3$, $4e_4$, $5e_5$. The $2^{nd}$ soft slicing process and the $3^{rd}$ soft slicing process produces the error terms as shown. As will be discussed in greater detail with reference to FIGS. 11-16, the soft slicing process produces only 6 error terms per bin for a 64 QAM function as opposed to 64 error terms as produced in prior art soft slicing modules. The benefits of reduced number of error terms should be readily apparent to one of average skill in the art and include, but are not limited to, reduced processing complexity, improved speed of processing, while maintaining accuracy of data recovery.

The error terms are de-interleaved to produce de-interleaved error terms. As shown, the $1^{st}$ set of error terms $0e_0$-$0e_5$ form a deinterleaved group of error terms having a corresponding I component and Q component. As will be discussed with reference to FIGS. 16-19, the de-interleaved error terms are converted to branch metrics, which are subsequently processed to recapture the raw data.

Note that the error terms produced by the soft slicing module 236 may have associated weighting factors, which are based on the signal strength of the corresponding sub-carrier. As such, when the de-interleaved error terms are processed to produce the branch metrics, the error terms having a larger weighting factor are given preferential treatment with respect to error terms having a lower weighting factor. This allows for greater accuracy in recapturing the data, since the error terms received via sub-carriers having greater signal-to-noise ratio are known to more accurately represent the actual data than information contained on sub-carrier channels having a smaller signal-to-noise ratio.

FIGS. 11-16 illustrate the generation of error terms from a recovered interleaved symbol for a 64 QAM process by the slicing module 236. If the encoding process utilizes 16 QAM, only 4 error terms would be generated per bin (e.g., $e_0$-$e_3$) and if QPSK modulation were to be used, only 2 error terms per bin are generated (e.g., $e_0$ and $e_1$). The examples of FIGS. 11-16 are based on a recovered interleaved symbol having a bit value of 101 111.

Figure 11:
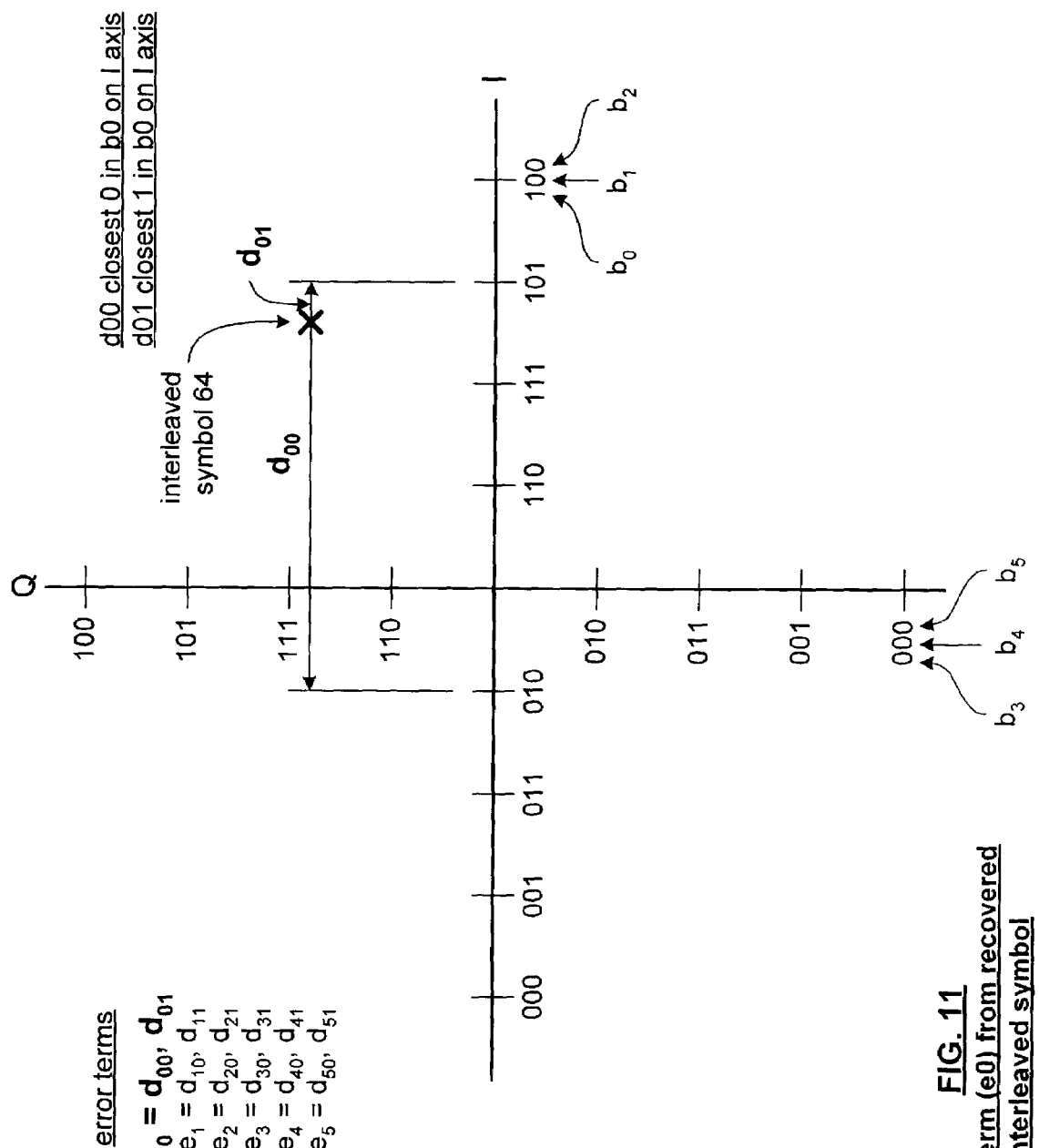
FIGS. 11-16 are graphical representations of determining error signals from recovered interleaved symbols in accordance with the present invention.

As shown in FIG. 11, the determination of error term ($e_0$) is derived based on the actual mapping of the interleave symbol 64. The $1^{st}$ error term $e_0$, includes two components (e.g., $d_{00}$ and $d_{01}$). $D_{00}$ corresponds to the closest 0 in bit position $b_0$ along the I axis and $d_{01}$ corresponds to the closest 1 in bit position $b_0$ on the I axis. In this example, $d_{00}$ is a physical distance that represents the distance from the interleave symbol 64 to 010 along the I axis. Similarly, $d_{01}$ corresponds to the physical distance from the interleave symbol 64 to 101 along the I axis. The accuracy of the distance is based on the number of bits contained within the $d_{00}$ and $d_{01}$ values. The more bits used to represent the distance, the greater the accuracy in the measurement. Note that this interleave symbol 101 111 corresponds to one recovered interleaved symbol of the plurality of recovered interleaved symbols. As such, this process is repeated 64 times, once for each recovered interleaved symbol from the corresponding sub-carriers.

Figure 12:
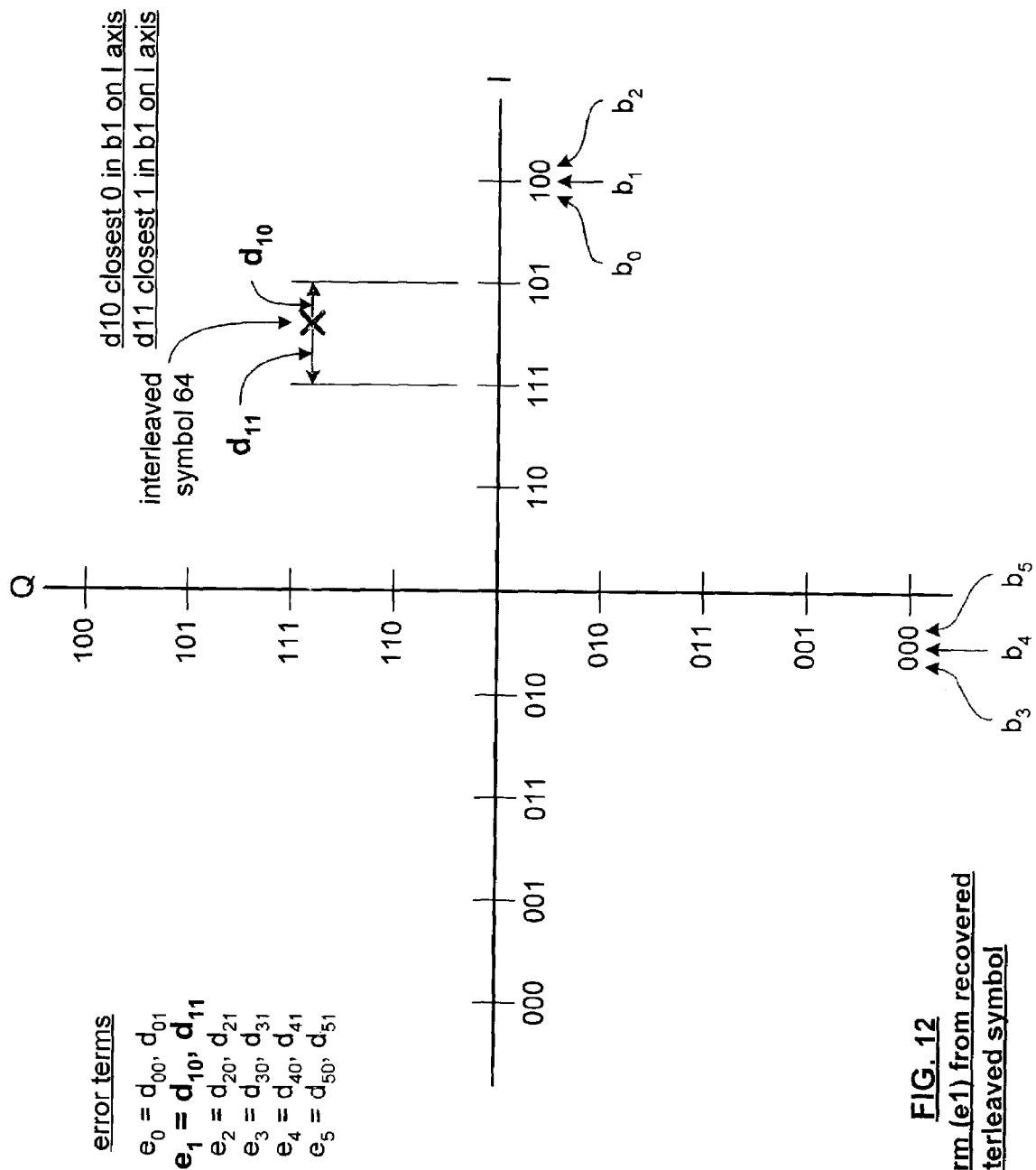

FIG. 12 illustrates a graphical representation of determining the $2^{nd}$ error term ($e_1$), which includes two terms $d_{10}$ and $d_{11}$. $d_{10}$ corresponds to the closest 0 in bit position $b_1$ on the I axis. $d_{11}$ corresponds to the closest 1 in bit position $b_1$ on the I axis. As shown, $d_{11}$ is the physical distance between the interleave symbol 64 and the ideal location along the I axis of 111. Similarly, $d_{10}$ corresponds to the distance between interleave symbol 64 and 101 along the I axis.

Figure 13:
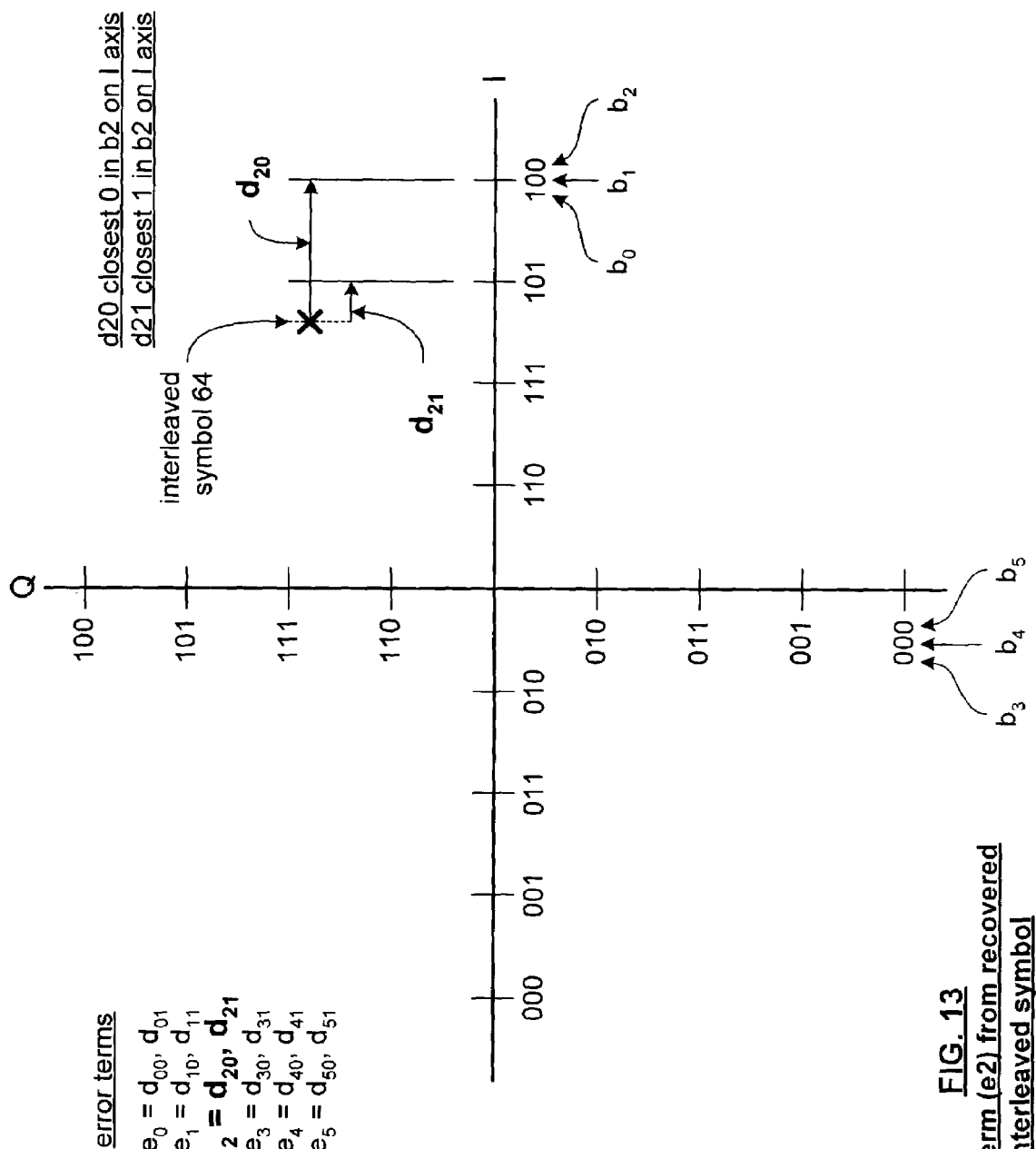

FIG. 13 illustrates the graphical representation of determining error term ($e_2$). Error term $e_2$ includes two values $d_{20}$ and $d_{21}$. $d_{20}$ corresponds to the closest 0 in bit position $b_2$ on the I axis and $d_{21}$ corresponds to the closest 1 in bit position $b_2$ on the I axis. In this example, the value $d_{20}$ corresponds to the physical distance between the interleave symbol 64 and the location 100 along the I axis. $d_{21}$ corresponds to the physical distance between the interleave symbol 64 and the location 101 along the I axis.

Figure 14:
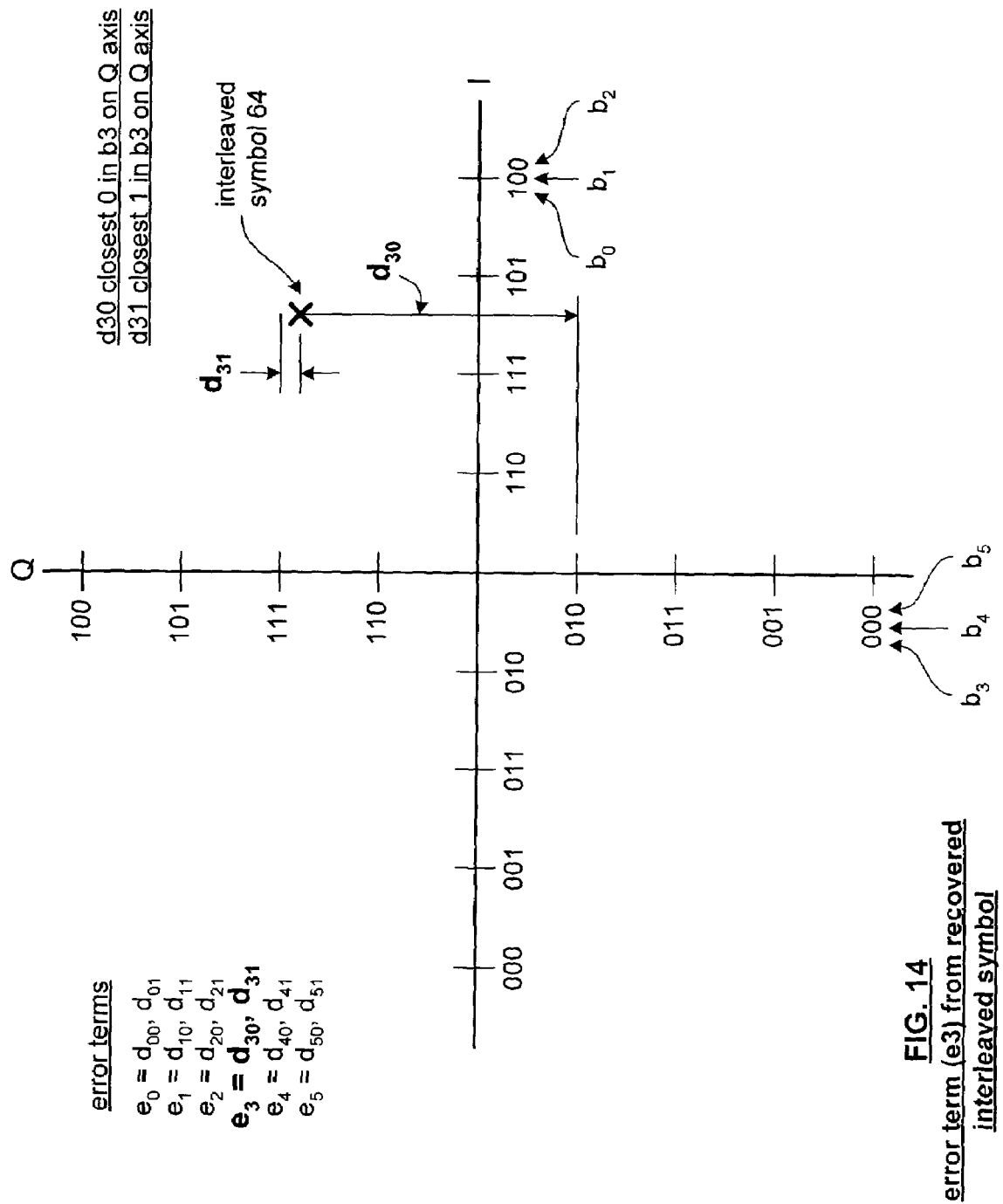

FIG. 14 illustrates the determination of error term $e_3$ for this recovered interleave symbol. Error term $e_3$ includes 2 values $d_{30}$ and $d_{31}$. $d_{30}$ corresponds to the closest 0 in bit position $b_3$ on the Q axis and $d_{31}$ corresponds to the closest 1 in bit position $b_3$ on the Q axis. As shown, $d_{31}$ represents the physical distance between the interleave symbol 64 and position 111 along the Q axis. $d_{30}$ corresponds to the physical distance between the interleave symbol 64 and 101 on the Q axis.

Figure 15:
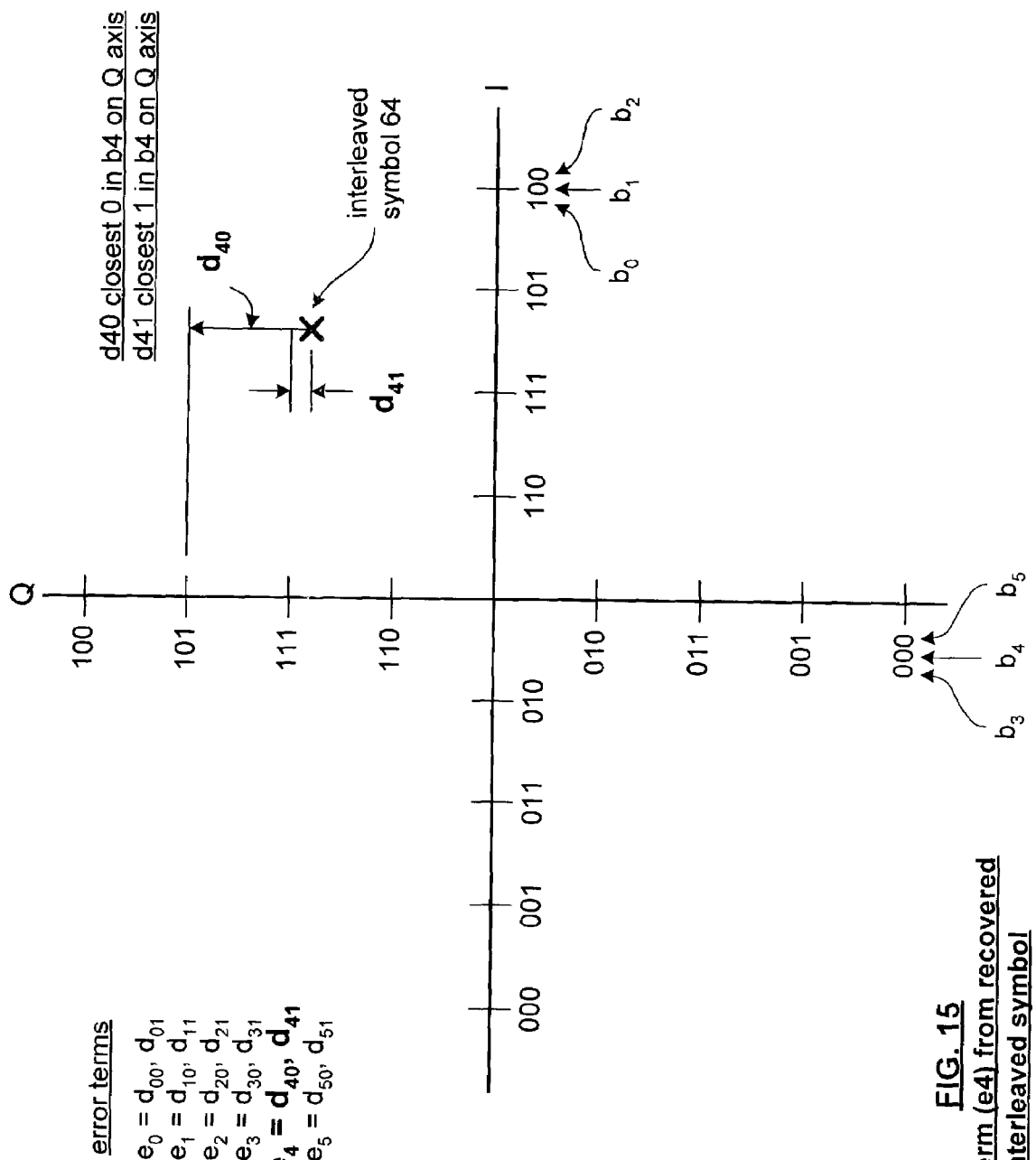

FIG. 15 illustrates a graphical representation of determining error term $e_4$ from the recovered interleave symbol. In this example, $e_4$ includes two values $d_{40}$ and $d_{41}$. $d_{40}$ corresponds to the closest 0 in bit position $b_4$ along the Q axis. $d_{41}$ corresponds to the closest 1 in the bit position $b_4$ along the Q axis. As shown, $d_{40}$ is the physical distance between the interleave symbol 64 and the 101 position along the Q axis. $d_{41}$ corresponds to the physical distance between the interleave symbol 64 and the position 111 along the Q axis.

Figure 16:
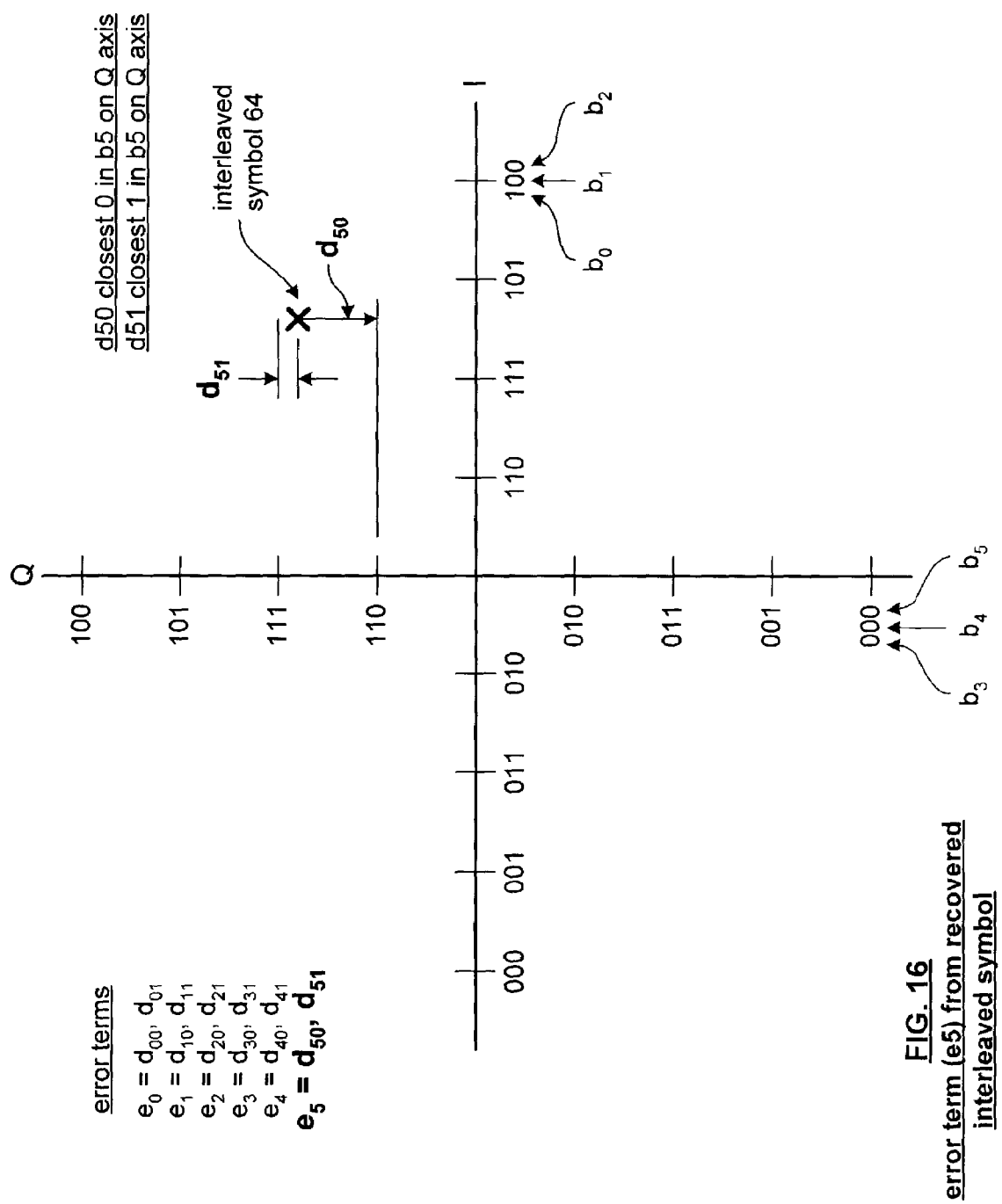

FIG. 16 illustrates an example of generating the error term $e_5$ from the recovered interleave symbol. The error term $e_5$ includes two values $d_{50}$ and $d_{51}$. $d_{50}$ corresponds to the closest 0 in bit position $b_5$ on the Q axis and $d_{51}$ corresponds to the closest 1 in bit position $b_5$ on the Q axis. As shown, $d_{50}$ is the physical distance between the interleave symbol 64 and position 110 along the Q axis. $d_{51}$ corresponds to the physical distance between the interleave symbol 64 and 111 on the Q axis. As graphically illustrated in FIGS. 11-16, the generation of a group of error terms by a soft slicing module 236 is accomplished using vertical or horizontal error distances and is done for each bin of equalized I and Q components 242.

Figure 17:
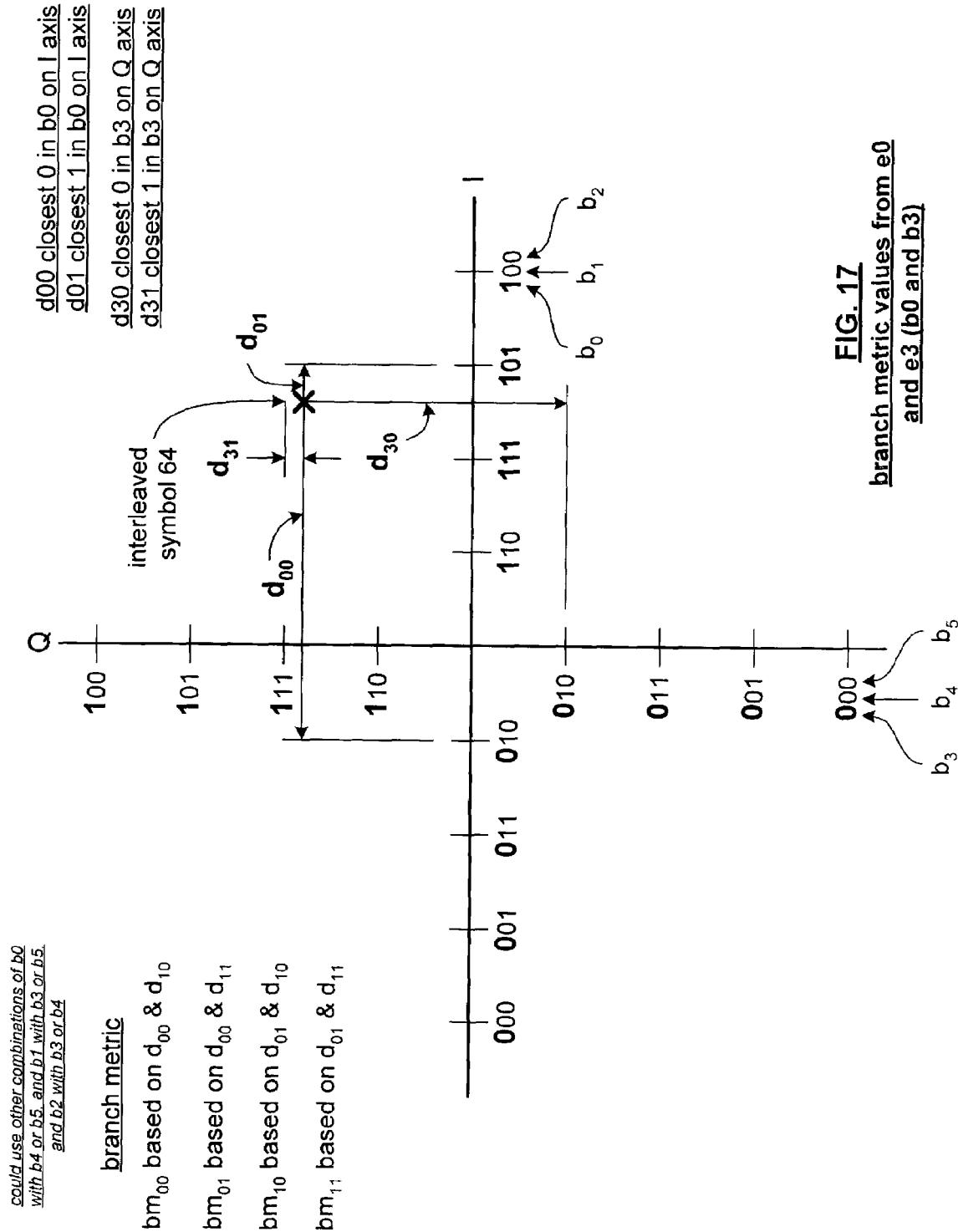
FIGS. 17-19 are graphical representations of determining branch metrics from error terms in accordance with the present invention.
Figure 18:
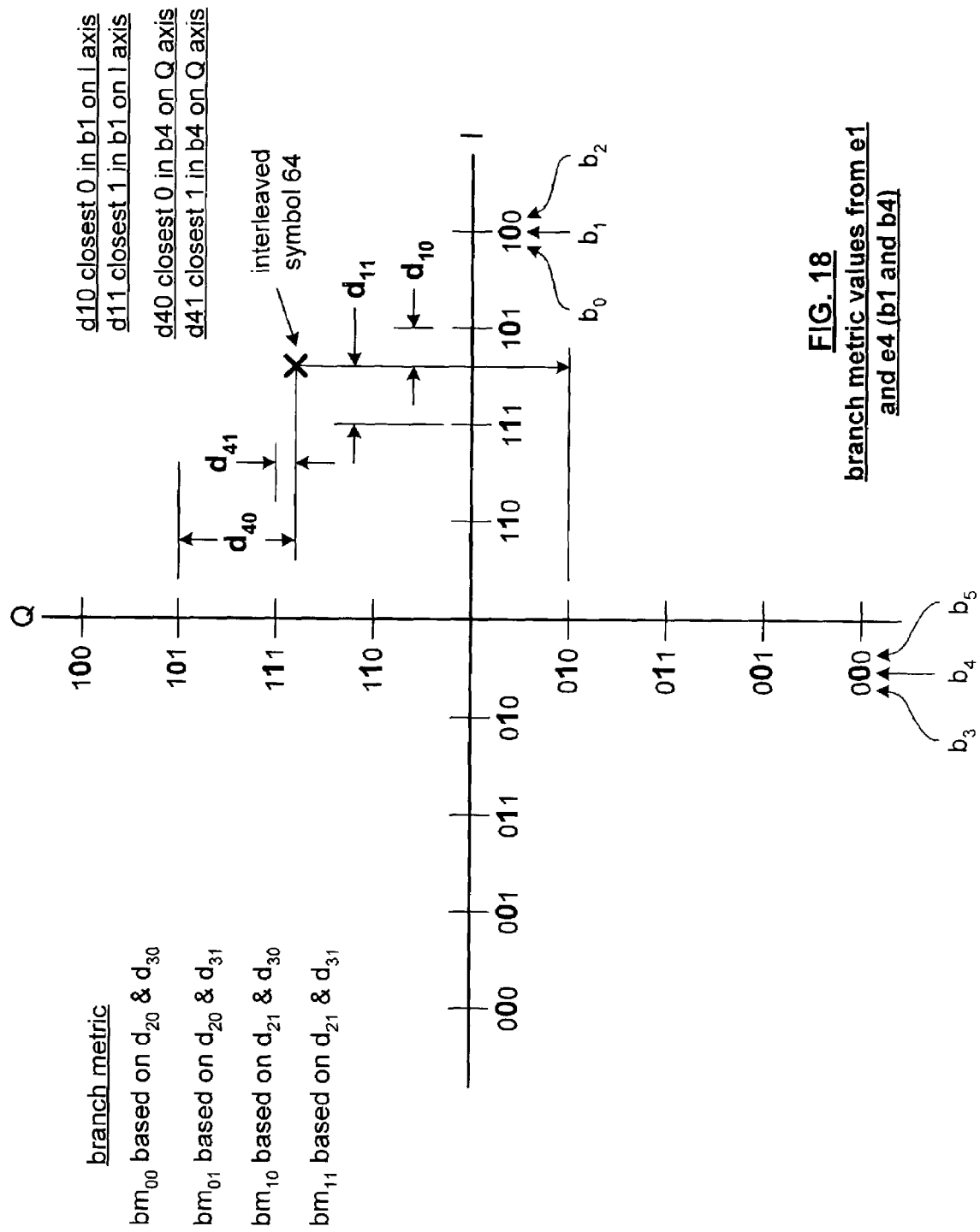
Figure 19:
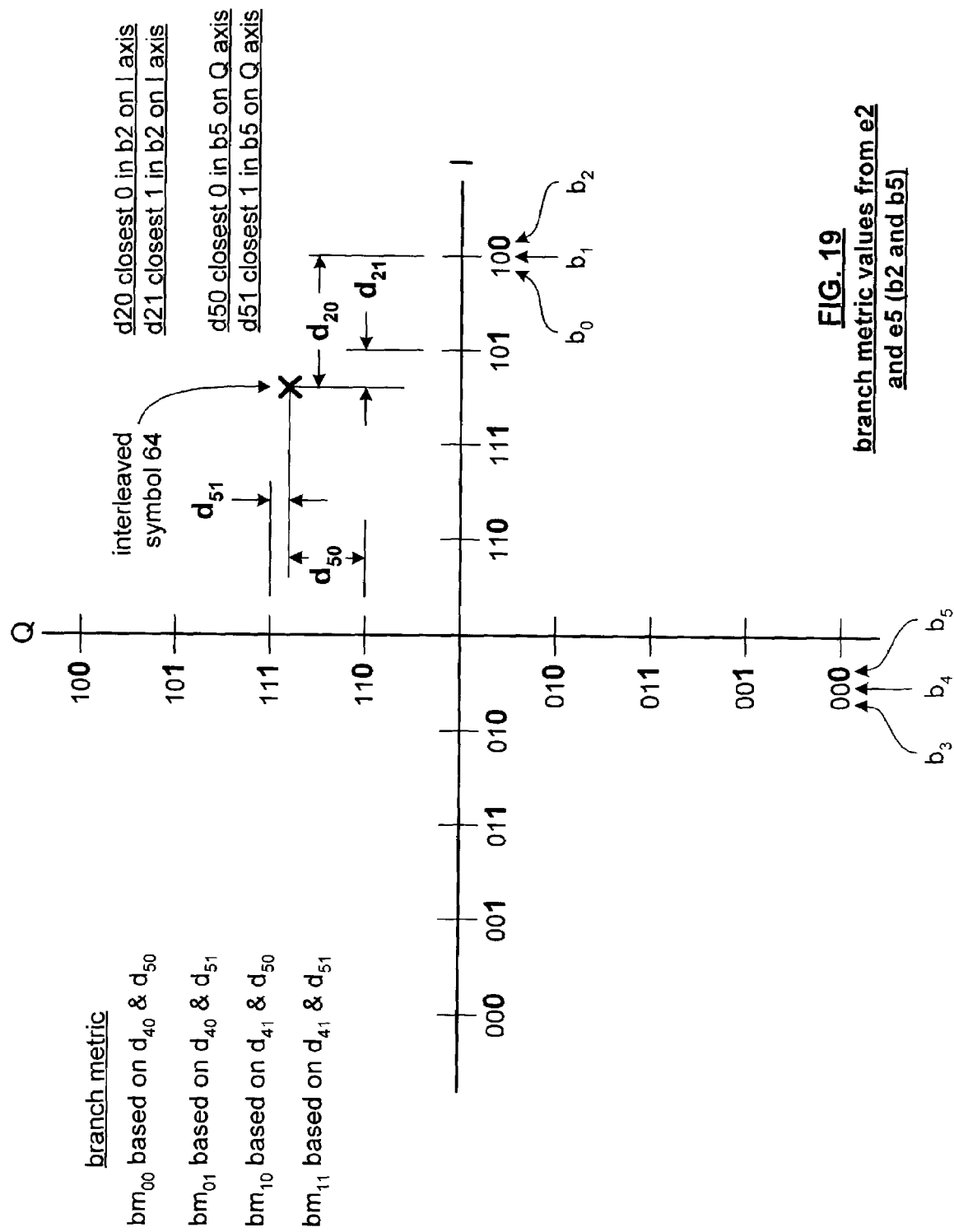

FIGS. 17-19 illustrate graphically the recapturing of data by converting the error terms into branch metrics and then reproducing the data. As shown in FIG. 17, a $1^{st}$ set of branch metrics ($bm_{00}$-$bm_{11}$) are determined based on the error term $e_0$ and error term $e_1$. In essence, the error terms correspond to the $1^{st}$ bit on the I axis and the $2^{nd}$ bit along the I axis. In general, based on the error terms $e_0$ and $e_1$, which include corresponding values $d_{00}$, $d_{01}$, $d_{10}$ and $d_{11}$, the branch metrics are determined (e.g., $bm_{00}=ABS(d_{00})+ABS(d_{01})$) and the corresponding bit 0 and bit 1 of the raw data are obtained. For a QPSK system, this is the only process performed to recapture the raw data. For 64 QAM, the current recovered data corresponds to 11x xxx, where x represents indeterminate values which will be determined as illustrated in FIGS. 18 and 19.

FIG. 18 illustrates the generation of a new set of branch metrics $bm_{00}$-$Bbm_{11}$ based on error term $e_2$ and error term $e_3$. In essence, the branch metrics, based on $e_2$ and $e_3$ determine the distances with respect to ideal bit positions in bit positions $b_2$ and $b_3$. As such, the interleave symbol 64 is positioned within a particular quarter of this particular quadrant. For 16 QAM, the decoding would stop here, thus producing a value of 1101.

FIG. 19 illustrates the final processing for 64 QAM based on error terms $e_3$ and $e_6$. From these error terms a set of branch metrics are determined $bm_{00}$-$bm_{11}$. From these error terms, the distance represented by the branch metrics from the interleave symbol 64 to the ideal symbol positions in bit position $b_5$ and bit position $b_6$ are determined.

FIG. 20 illustrates a schematic block diagram of an apparatus 280 for signal decoding in a diversity reception system with maximum ratio combining that includes a processing module 282 and memory 284. The processing module 282 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 284 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 282 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. The memory 284 stores, and the processing module 282 executes, operational instructions corresponding to at least some of the steps and/or functions illustrated in FIGS. 1-19 and 21.

FIG. 21 illustrates a logic diagram of a method for decoding a multiple received RF signal with maximum ratio combining. The process begins at step 300 by converting the multiple received RF signal into a plurality of digital baseband signals. At step 310, the process proceeds by phase aligning the plurality of digital baseband signals to produce a plurality of phase aligned digital baseband signals. At step 320, a plurality of error terms are determined from the plurality of phase aligned digital baseband signals, wherein one of the plurality of error terms has a corresponding one of the plurality of phase aligned digital baseband signals. At step 330, the process determines a plurality of weighting factors for the plurality of error terms based on characteristics of the plurality of digital baseband signals, wherein one of the plurality of weighting factors has a corresponding one of the plurality of error terms. The process then proceeds to step 340 by applying the plurality of weighting factors to the plurality of error terms to produce a plurality of weighted error terms. The plurality of weighted error terms are summed at step 350 to produce an overall error term and at step 360 the process decodes the error term to recapture data from the multiple received RF signal.

The characteristics of the plurality of digital baseband signals can include at least one of: a frequency response coefficient of each signal, a signal-to-noise ratio ("SNR") of each signal, a radio signal strength indicator ("RSSI") of each signal, a signal-to-interference ratio of each channel, and a signal-to-impairment ratio of each channel. Further, phase aligning the plurality of digital baseband signals comprises equalizing the plurality of digital baseband signals to generate a corresponding frequency domain equalization ("FEQ") coefficient for each of the plurality of digital baseband signals, wherein the FEQ coefficient is a value representing the degree of frequency equalization applied to its corresponding digital baseband signal. Equalizing the plurality of digital baseband signals can further comprise equalizing the amplitudes of the plurality of digital baseband signals. In this case, an FEQ coefficient is a value representing the degree of amplitude equalization and frequency equalization applied to its corresponding digital baseband signal.

The embodiments of the method of this invention can determine the plurality of weighting factors based on the FEQ coefficients. The plurality of weighting factors can be applied to the plurality of error terms in the log domain. Similarly, the FEQ coefficients can be converted to the log domain to indicate a shift amount in each of the plurality of error terms. The method of this invention can also determine a maximum ratio of each of the plurality of weighted error terms, and can determine the maximum ratio in the log domain.

The multiple received RF signal can comprise one carrier of a multiple carrier signal. The embodiments of the method of this invention can be performed for each carrier of the multiple carrier signal. The multiple carrier signal can be an orthogonal frequency division multiplexing ("OFDM") modulated signal. The multiple received RF signal can be received at a multiple switched diversity antenna structure. The method of this invention can further comprise receiving a plurality of multiple received RF signals, wherein each of the plurality of multiple received RF signals comprises the same data set, and selecting one of the plurality of multiple received RF signals for converting into the plurality of digital baseband signals. The embodiments of the decoding method of this invention can decode the error terms by means of a Viterbi decoder implementing a Viterbi decoding algorithm.

The embodiments of the method and apparatus for decoding a multiple received radio frequency (RF) signal of the present invention can thus reduce or eliminate the complexity, redundancy and high cost of prior art solutions. The various embodiments of the method and apparatus of this invention can be incorporated in a radio or other wireless communication device. Further, embodiments of this invention can be incorporated in a multimedia server that provides multiple data streams to a plurality of client modules. As one of average skill in the art will appreciate, other embodiments may be derived from the teaching of the present invention, without deviating from the scope of the claims.

What is claimed is:

1. A method for decoding a received radio frequency (RF) signal, the method comprises:
    converting the received RF signal into a plurality of digital baseband signals;
    phase aligning the plurality of digital baseband signals to produce a plurality of phase aligned digital baseband signals;
    determining a plurality of error terms from the plurality of phase aligned digital baseband signals, wherein one of the plurality of error terms has a corresponding one of the plurality of phase aligned digital baseband signals;
    determining a plurality of weighting factors for the plurality of error terms based on characteristics of the plurality of digital baseband signals, wherein one of the plurality of weighting factors has a corresponding one of the plurality of error terms;
    applying the plurality of weighting factors to the plurality of error terms to produce a plurality of weighted error terms;
    summing the plurality of weighted error terms to produce an error term; and
    decoding the error term to recapture data from the received RF signal.

2. The method of claim 1, wherein the characteristics of the plurality of digital baseband signals include at least one of: a frequency response coefficient of each signal, a signal-to-noise ratio ("SNR") of each signal, a radio signal strength indicator ("RSSI") of each signal, a signal-to-interference ratio of each channel, and a signal-to-impairment ratio of each channel.

3. The method of claim 1, wherein phase aligning the plurality of digital baseband signals comprises equalizing the plurality of digital baseband signals to generate a corresponding frequency domain equalization ("FEQ") coefficient for each of the plurality of digital baseband signals, wherein the FEQ coefficient is a value representing the degree of frequency equalization applied to its corresponding digital baseband signal.

4. The method of claim 3, wherein equalizing the plurality of digital baseband signals further comprises equalizing the amplitudes of the plurality of digital baseband signals, and wherein the FEQ coefficient is a value representing the degree of amplitude equalization and frequency equalization applied to its corresponding digital baseband signal.

5. The method of claim 4, wherein determining the plurality of weighting factors comprises determining the plurality of weighting factors based on the FEQ coefficients.

6. The method of claim 4, wherein the plurality of weighting factors are applied to the plurality of error terms in the log domain.

7. The method of claim 6, further comprising convening the FEQ coefficients to the log domain to indicate a shift amount in each of the plurality of error terms.

8. The method of claim 1, further comprising determining a maximum ratio of each of the plurality of weighted error terms.

9. The method of claim 8, wherein determining the maximum ratio comprises determining the maximum ratio in the log domain.

10. The method of claim 1, wherein decoding the error tern comprises Viterbi decoding the error term.

11. The method of claim 1, wherein the multiple received RF signal is one carrier of a multiple carrier signal.

12. The method of claim 1, wherein the method is performed for each carrier of the multiple carrier signal.

13. The method of claim 11, wherein the multiple carrier signal is an orthogonal frequency division multiplexing ("OFDM") modulated signal.

14. The method of claim 1, further comprising receiving the received RF signal at a multiple switched diversity antenna structure.

15. The method of claim 1, further comprising:
    receiving a plurality of received RF signals, wherein each of the plurality of multiple received RF signals comprises a same data set; and
    selecting one of the plurality of multiple received RF signals for converting into the plurality digital baseband signals.

16. An apparatus for decoding a received radio frequency (RF) signal, the apparatus comprises:
    a processing module; and
    a memory operably coupled to the processing module, wherein the memory includes operational instructions that cause the processing module to:
    convert the received RF signal into a plurality of digital baseband signals;

phase align the plurality of digital baseband signals to produce a plurality of phase aligned digital baseband signals;

determine a plurality of error terms from the plurality of phase aligned digital baseband signals, wherein one of the plurality of error terms has a corresponding one of the plurality of phase aligned digital baseband signals;

determine a plurality of weighting factors for the plurality of error terms based on characteristics of the plurality of digital baseband signals, wherein one of the plurality of weighting factors has a corresponding one of the plurality of error terms;

apply the plurality of weighting factors to the plurality of error terms to produce a plurality of weighted error terms;

sum the plurality of weighted error terms to produce an error term; and decode the error term to recapture data from the received RF signal.

17. The apparatus of claim 16, wherein the characteristics of the plurality of digital baseband signals include at least one of: a frequency response coefficient of each signal, a signal-to-noise ratio ("SNR") of each signal, a radio signal strength indicator ("RSSI") of each signal, a signal-to-interference ratio of each channel, and a signal-to-impairment ratio of each channel.

18. The apparatus of claim 16, wherein the memory further comprises operational instructions that cause the processing module to phase align the plurality of digital baseband signals by equalizing the plurality of digital baseband signals to generate a corresponding frequency domain equalization ("FEQ") coefficient for each of the plurality of digital baseband signals, wherein the FEQ coefficient is a value representing the degree of frequency equalization applied to its corresponding digital baseband signal.

19. The apparatus of claim 16, wherein the memory further comprises operational instructions that cause the processing module to equalize the plurality of digital baseband signals by equalizing the amplitudes of the plurality of digital baseband signals, and wherein the FEQ coefficient is a value representing the degree of amplitude equalization and frequency equalization applied to its corresponding digital baseband signal.

20. The apparatus of claim 19, wherein the memory further comprises operational instructions that cause the processing module to determine the plurality of weighting factors based on the FEQ coefficients.

21. The apparatus of claim 19, wherein the memory further comprises operational instructions that cause the processing module to apply the plurality of weighting factors to the plurality of error terms in the log domain.

22. The apparatus of claim 21, wherein the memory further comprises operational instructions that cause the processing module to convert the FEQ coefficients to the log domain to indicate a shift amount in each of the plurality of error terms.

23. The apparatus of claim 16, wherein the memory further comprises operational instructions that cause the processing module to determine a maximum ratio of each of the plurality of weighted error terms.

24. The apparatus of claim 23, wherein the memory further comprises operational instructions that cause the processing module to determine the maximum ratio in the log domain.

25. The apparatus of claim 16, wherein decoding the error term comprises Viterbi decoding the error term.

26. The apparatus of claim 16, wherein the received RF signal is one carrier of a multiple carrier signal.

27. The apparatus of claim 26, wherein the memory further comprises operational instructions that cause the processing module to perform the same process for each carrier of the multiple carrier signal.

28. The apparatus of claim 26, wherein the multiple carrier signal is an orthogonal frequency division multiplexing ("OFDM") modulated signal.

29. The apparatus of claim 16, wherein the memory further comprises operational instructions that cause the processing module to receive the received RF signal at a multiple switched diversity antenna structure.

30. The apparatus of claim 16, wherein the memory further comprises operational instructions that cause the processing module to:

receive a plurality of received RF signals, wherein each of the plurality of received RF signals comprises a same data set; and select one of the plurality of received RF signals for converting into the plurality digital baseband signals.

* * * * *